(12) United States Patent
Perreault et al.

(10) Patent No.: US 8,670,254 B2
(45) Date of Patent: Mar. 11, 2014

(54) GRID-TIED POWER CONVERSION CIRCUITS AND RELATED TECHNIQUES

(75) Inventors: David J. Perreault, Brookline, MA (US); Brandon J. Pierquet, Petaluma, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 419 days.

(21) Appl. No.: 13/011,317

(22) Filed: Jan. 21, 2011

(65) Prior Publication Data

US 2011/0181128 A1 Jul. 28, 2011

Related U.S. Application Data

(60) Provisional application No. 61/297,509, filed on Jan. 22, 2010.

(51) Int. Cl.
*H02M 7/48* (2007.01)

(52) U.S. Cl.
USPC ............................................. 363/71; 363/159

(58) Field of Classification Search
USPC ............. 363/16–20, 21.01–21.03, 49, 65, 72, 363/79, 89, 95, 97, 98, 159
See application file for complete search history.

(56) References Cited

U.S. PATENT DOCUMENTS

| | | | |
|---|---|---|---|
| 3,370,215 A | 2/1968 | Light, Jr. | |
| 5,159,539 A | 10/1992 | Koyama | |
| 5,198,970 A | 3/1993 | Kawabata et al. | |
| 5,268,832 A * | 12/1993 | Kandatsu | 363/95 |
| 5,331,303 A | 7/1994 | Shiota | |
| 5,982,645 A * | 11/1999 | Levran et al. | 363/37 |
| 6,339,538 B1 | 1/2002 | Handleman | |
| 6,507,503 B2 * | 1/2003 | Norrga | 363/17 |
| 6,700,803 B2 | 3/2004 | Krein | |
| 6,934,167 B2 * | 8/2005 | Jang et al. | 363/21.02 |
| 7,072,195 B2 * | 7/2006 | Xu | 363/95 |
| 7,269,036 B2 * | 9/2007 | Deng et al. | 363/49 |
| 7,521,914 B2 | 4/2009 | Dickerson et al. | |
| 7,768,800 B2 | 8/2010 | Mazumduer et al. | |
| 7,940,038 B2 | 5/2011 | Da Silva et al. | |
| 8,130,518 B2 | 3/2012 | Fishman | |
| 2004/0170030 A1 | 9/2004 | Duerbaum et al. | |
| 2009/0196082 A1 | 8/2009 | Mazumder et al. | |
| 2009/0302686 A1 | 12/2009 | Fishman | |
| 2009/0323380 A1 | 12/2009 | Harrison | |
| 2010/0142239 A1 | 6/2010 | Hopper | |
| 2011/0181128 A1 | 7/2011 | Perreault et al. | |

OTHER PUBLICATIONS

PCT Search Report of the ISA for PCT/US2011/022056 dated Sep. 23, 2011.
Written Opinion of the ISA for PCT/US2011/022056 dated Sep. 23, 2011.
Alspach; "Solar Power Inverter Manufacturers Get Day in Sun;" Boston Business Journal; Oct. 29, 2010; 1 page.
Denning; "Solar Market Is Risking Sunstroke;" Wall Street Journal; Dec. 11-12, 2010, 1 page.

(Continued)

*Primary Examiner* — Rajnikant Patel
(74) *Attorney, Agent, or Firm* — Daly, Crowley, Mofford & Durkee, LLP

(57) ABSTRACT

Circuit topologies and control methods for a power converter and are described.

24 Claims, 14 Drawing Sheets

(56) References Cited

OTHER PUBLICATIONS

Pierquet, et al.; "A Single-Phase Photovoltaic Inverter Topology with a Series-Connected Power Buffer;" (ECCE), IEEE, Sep. 2010, pp. 1-9.
Trubitsyn, et al.; High-Efficiency Inverter for Photovoltaic Applications; (ECCE), IEEE, Sep. 2010, pp. 1-9.
Bush, et al.; "A Single-Phase Current Source Solar Inverter with Reduced-Size DC Link;" Energy Conversion Congress and Exposition; IEEE; Sep. 20, 2009; pp. 54-59.
Krein, et al.; "Cost-Effective Hundred-Year Life for Single-Phase Inverters and Rectifiers in Solar and LED Lighting Applications Based on Minimum Capacitance Requirements and a Ripple Power Port;" Applied Power Electronics Conference and Exposition; IEEE; Feb. 15, 2009; pp. 620-625.
Li; "A Review of the Single Phase Photovoltaic Module Integrated Converter Topologies With Three Different DC Link Configurations;" IEEE Transactions on Power Electronics; vol. 23; No. 3; May 2008; pp. 1320-1333.
Invitation to Pay Additional Fees in PCT/US2011/022056 dated Jul. 5, 2011.
Partial Search Report of the ISA for PCT/US2011/022056 dated Jul. 5, 2011.
International Preliminary Report on Patentability for PCT/US2011/022056 dated Aug. 2, 2012.
International Search Report of the ISA for PCT/US2013/030383 dated May 13, 2013.
Written Opinion of the ISA for PCT/US2013/030383 dated May 13, 2013.
Perreault, et al.; U.S. Appl. No. 13/795,633, filed Mar. 12, 2013.

\* cited by examiner

GRID-TIED POWER CONVERSION CIRCUITS AND RELATED TECHNIQUES

CROSS REFERENCE TO RELATED APPLICATIONS

This application claims the benefit of U.S. Provisional Application No. 61/297,509 filed Jan. 22, 2010 under 35 U.S.C. §119(e) which application is hereby incorporated herein by reference in its entirety.

STATEMENT REGARDING FEDERALLY SPONSORED RESEARCH

Not Applicable.

FIELD OF THE INVENTION

The concepts described herein relate to grid connected electronics, and more particularly to photovoltaic inverter systems.

BACKGROUND OF THE INVENTION

As is known in the art, a photovoltaic (PV) system is a system which uses one or more solar cells (also sometimes simply referred to as "cells") to convert light into electricity. Due to the relatively low voltage of an individual solar cell (typically on the order of 0.5 volts (V)), several solar cells are often combined into PV panels (also sometimes referred to as PV modules) which are in turn connected together into an array.

The electricity generated can be either stored, used directly (so-called island/stand-alone plant) or fed into a large electricity grid powered by central generation plants (so-called grid-connected/grid-tied plant) or combined with one or many domestic electricity generators to feed into a small grid (a so-called "hybrid plant").

As is also known, a PV system which is connected to an independent grid (e.g. the public electricity grid) and which is capable of feeding power into the grid is often referred to as a grid-connected system. This is a form of decentralized electricity generation. In the case of a building mounted grid connected PV system (e.g. a residential or office building), the electricity demand of the building is met by the PV system and any excess electricity is fed into the grid. The feeding of electricity into the grid requires the transformation of direct current (DC) into alternating current (AC). This function is performed by an inverter.

On the AC side, grid-connected inverters supplies electricity in sinusoidal form, synchronized to the grid frequency, limit feed in voltage to no higher than the grid voltage.

On the DC side, the power output of a module varies as a function of the voltage in a way that power generation can be optimized by varying the system voltage to find a so-called maximum power point. Most inverters therefore incorporate maximum power point tracking.

The AC output is typically coupled across an electricity meter into the public grid. The electricity meter preferably runs in both directions since at some points in time, the system may draw electricity from the grid and at other points in time, the system may supply electricity to the grid.

As is also known, an initial use of power from AC electricity distribution system was focused on automating machinery and to provide lighting. While then basic designs are still in use a century later (albeit more refined), such designs have been increasingly replaced by more advanced implementations, or alternatives that don't utilize AC signals natively. Instead, modern grid connected machines and devices convert the grid voltage provided thereto to a more appropriate form such as direct current (dc) voltage or high-frequency modulated AC voltage. Additionally, much electricity used today is in residential and commercial environments, a shift from the primarily industrial usage a century ago.

As is also known, grid tied inverters for photovoltaic (PV) systems have also evolved since their inception. Grid tied inverters for PV systems traditionally managed large series-parallel connected arrays and then evolved to also handle lower power strings of panels, and have further evolved to operate with a single PV module. Inverters which operate with a single PV module are referred to as micro-inverters or module integrated converters (MIC). Micro-inverters provide a number of benefits including ease of installation, system redundancy, and increased performance in partially shaded conditions.

One drawback of such systems, however, is the difficulty in obtaining the same efficiencies as inverters which manage multiple modules in series at higher power levels. For example, a single 72-cell panel having a nominal output voltage of 36 volts (V) requires a transformation ratio to interface with a root mean square (RMS) grid voltage of 240 V AC, which is much larger than that required by a series string of ten panels.

Connecting electronic devices to an AC distribution system is a well understood task, and significant work has been completed in both sourcing power from, and delivering power to the grid. Much of this work is focused on three-phase interconnection of varying line voltages, with power levels ranging from 10-500 kW, often for applications in motor drives, electric vehicle drive-trains, wind turbines, and uninterruptible power supply (UPS) systems. At these power levels, with a three phase distribution system, efficiencies up to 98% are achievable. This is in contrast to electrical systems found in commercial and residential environments, which often operate on single or split-phase systems at a significantly lower power level. This results in an increased difficulty to maintain high energy conversion efficiencies.

One challenge for such single phase converters is the DC plus sinusoidally varying power transfer to the grid. This results in the need for a converter capable of processing power from zero to double the average power, at twice the line frequency.

SUMMARY OF THE INVENTION

It would, therefore, be desirable to provide a circuit and technique which achieves a reduction in converter power loss.

As is appreciated by those of ordinary skill in the art, achieving a reduction in converter power loss for a system with an already high efficiency is a non-trivial matter. The significance in progressing from 94% to 97% efficiency is more appropriately viewed as reducing loss from 6% to 3%, which is a factor of two lower loss.

In accordance with the present concepts, systems and techniques described herein, circuit topologies and control methods for power converters, including grid-connected power converters, are described. In the case of grid-connected power converters, the circuits and methods described herein meet the same system requirements as conventional designs while improving efficiency, providing future scalability, and the possibility of bidirectional power flow between a grid and a direct current (DC) source and/or energy buffer.

The converter topologies and techniques described herein posses a number of desirable capabilities and loss reduction strategies. For example, converter circuits in accordance with the concepts described herein decouple energy storage from photovoltaic (PV) panel voltage and power tracking requirements. Decoupling energy storage from PV panel voltage and power tracking requirements allows variable-voltage energy storage. The concepts and circuits described herein also utilize full soft-switching when implemented with unipolar devices. This allows conduction losses to scale back super-linearly (or in some cases super-linearly) with output power. Moreover, the circuit is controllable over wide input and output voltages, and output power levels. Also, the use of unipolar devices allows full bi-directional power flow (four quadrant) operation, enabling the converter to perform reactive power compensation on a grid.

In one embodiment, power conversion circuits described herein are provided having a series buffer block architecture. The buffer is controlled to absorb or deliver power to a storage port which compensates for a power mismatch between DC and AC ports of an inverter circuit. In some embodiments a buffer block is positioned on the high-voltage side of a transformer. This reduces the required transformer turns ratio and applied volt-seconds. Also, placing the buffer block on the high voltage side of the transformer lowers current through the buffer block. Also, storing the buffering energy can be readily accomplished with high-voltage capacitors, which is sometimes beneficial in terms of capacitor energy density.

In other embodiments a buffer block is positioned on the low-voltage side of a transformer. Placing the buffer block on the low voltage side of the transformer allows low-voltage switching devices to be used, which is often beneficial in terms of device loss and cost.

In one embodiment, a PV micro inverter provided in accordance with the concepts described herein includes a DC connected inverter which transforms a DC source into high frequency alternating current (AC) signal via a transformation stage. The transformation stage provides both voltage gain and appropriate impedance shaping. A cycloconverter is coupled to the transformation stage through a buffer. The cycloconverter is controlled to modulate the transfer of high frequency resonant current in response to changing voltage of an AC port; the buffer acts in a similar manner, but is controlled to absorb or deliver power to a storage port which compensates for a power mismatch between DC and AC inverter ports.

In one embodiment, a PV micro inverter provided in accordance with the concepts described herein includes a DC connected inverter coupled to a transformation stage through a series coupled buffer. The transformation stage transforms a DC signal coupled thereto from a DC source to an AC signal. The transformation stage provides both voltage gain and appropriate impedance shaping. A cycloconverter has a first port coupled to the transformation stage and a second port (or AC port) at which an AC signal is provided. The cycloconverter is controlled to modulate the transfer of high frequency resonant current in response to changing voltage of at the AC port. The buffer acts in a similar manner, but is controlled to absorb or deliver power to a storage port which compensates for a power mismatch between DC and AC inverter ports.

In comparison to existing designs, the topology and techniques described herein effectively place all major power processing blocks, (e.g. the high-frequency inverter, buffer-block, and cycloconverter) in a series path with respect to the high-frequency resonant current. This allows power-flow to be modulated in each block by simply modifying the switching function relative to the current, achieving zero voltage switching (ZVS) for all devices. It should be appreciated that as used herein the phrase "effectively [placing] all major power processing blocks . . . in a series path" accounts for the condition that if the effect of the transformer is assumed to be only to scale current, then one side of the transformer carries a scaled version of the same current on the other side of the transformer. The "scaled version" of the current is true for an ideal transformer, and approximately true for a real transformer. Since each side of the transformer does not carry the same current, it could be argued that all major power processing blocks may not be considered to meet a strict, literal definition of a "series" path. However, it should be appreciated that if one "reflected" the circuit on one side of the transformer to the other, the elements would be in series. Thus, use of the word "effectively" implies accounting for current scaling of the transformer and neglecting the contribution of parasitics such as transformer magnetizing current.

The placement of each block effectively in series with the drive current seems, at first glance, to impose a heavy conduction loss penalty. However, using unipolar devices such as metal oxide semiconductor field effect transistors (MOSFETs) and implementing ZVS for the primary switches, allows the semiconductor area to be scaled up to reduce conduction loss. This is in opposition to devices such as insulated gate bipolar transistors (IGBTs), semiconductor-controlled rectifiers (SCRs), and diodes which operate with a fixed on-state voltage drop, an intrinsic property of the devices, which is not scalable.

Additionally, the configurations described herein present a clear opportunity to scale with improvements in semiconductor technology, such as silicon-carbide and gallium-nitride devices. This is because the proposed approach can be implemented with devices having resistive on-state drops (which can be reduced as device technology improves), while many other topologies operate with fixed on-state voltage drop devices, whose loss does not appreciably improve as technology scales forward.

A second closely-related topology variant can be derived from the previously outlined converter. In accordance with the concepts and techniques described herein, it has been found that eliminating the buffer-block structure, and instead placing energy storage across the DC port, still provides a number of the original topology benefits. Full soft-switching with unipolar devices, wide operating range control, and four-quadrant control still remain realizable in such a simplified topology.

Advantages of implementing a converter with a buffer block architecture include but are not limited to: greater flexibility of control and of buffering energy (and providing reactive power) without influencing the voltage at the panel; the ability to store buffering energy at high voltage; improved design of the transformer (including lower turns ratio and lower volt-seconds rating); and reduced peak power processing requirement of the inverter.

Advantages of implementing a converter without a series buffer block architecture includes topological and control simplicity. This can be achieved using the cycloconverter circuit described herein.

In accordance with one aspect of the concepts, circuits and techniques described herein, a power conversion circuit has an input port configured to receive a direct current (DC) input and an output port at which an alternating current (AC) output is provided. The power conversion circuit includes an inverter circuit having an inverter input port coupled to the input port of the power conversion circuit and at which a DC signal is provided and having an inverter output port at which an AC signal is provided. The inverter circuit output port is coupled to a low voltage port of transformer circuit and a high voltage port of the transformer is coupled to an input port of a cycloconverter circuit. An output port of the cycloconverter circuit is coupled to an output port of the power conversion circuit and in preferred embodiments corresponds to the output port of the power conversion circuit. A buffer block circuit (which is provided as a two terminal or one port device) is series coupled between at least two of: an output port the inverter; a low voltage port of the transformer; a high voltage port of the transformer; and an input port of the cycloconverter.

With this particular arrangement, the cycloconverter operates with both halves modulating (but neither held fully on in the case when the voltage polarity may be unknown—e.g. for the case where the AC voltage polarity would cause the diodes of the modulating half-bridge to both conduct). Stated differently, it is desired to operate the cycloconverter with one half held on except when the voltage polarity may be unknown. The buffer block circuit acts to absorb local average differences in power between that received at the input port of the power conversion circuit and delivered to the output port of the power conversion circuit.

In accordance with a further aspect of the concepts, circuits and techniques described herein, a power conversion circuit having a pair of input terminals configured to receive a direct current (DC) voltage signal and a pair of output terminals at which an alternating current (AC) voltage signal is provided includes an inverter circuit coupled to a first port of a transformation stage and a cycloconverter coupled to a second port of the transformation stage.

The inverter circuit is configured to convert between a DC voltage signal at the input port thereof and provide a high-frequency AC signal at the output port thereof. The transformation stage is configured provide voltage scaling of the high-frequency AC signal. The transformation stage ideally also serves to isolate the inverter circuit from the output of the power conversion circuit. The cycloconverter is configured to receive the high-frequency AC signal to frequency convert between the high-frequency AC signal and the AC signal at the output of the power conversion circuit. In one embodiment, the cycloconverter includes a first half-bridge circuit having first, second and third terminals and a second half-bridge circuit having first, second and third terminals. The first terminal of each of the first and second half-bridge circuits correspond to the input of the cycloconverter circuit, the second terminal of each of the first and second half-bridge circuits correspond to the output of the cycloconverter circuit and the third terminal of the first half-bridge circuit is coupled to the third terminal of the second half-bridge circuit.

In accordance with a still further aspect of the concepts, circuits and techniques described herein, a cycloconverter circuit includes a first half-bridge circuit having first, second and third terminals with the first half-bridge circuit comprising first and second switches each having first, second and third terminals and a bypass capacitor and a second half-bridge circuit having first, second and third terminals with the second half-bridge circuit comprising first and second switches each having first, second and third terminals and a bypass capacitor wherein the first terminal of each of the first and second half-bridge circuits correspond to the input of the cycloconverter circuit, the second terminal of each of the first and second half-bridge circuits correspond to the output of the cycloconverter circuit and the third terminal of the first half-bridge circuit is coupled to the third terminal of the second half-bridge circuit.

With this particular arrangement, a cycloconverter which can be used in a power conversion circuit to process an AC component of power occurring at twice a line frequency is provided. In one embodiment, for a first range of an output voltage signal provided at the output of the cycloconverter circuit, the first and second switches of the first half-bridge circuit are biased into their conduction states and the first and second switches of the second half-bridge are modulated and for a second different range of an output voltage signal provided at the output of the cycloconverter circuit, the first and second switches of the second half-bridge circuit are biased into their conduction states and the first and second switches of the first half-bridge circuit are modulated. In one embodiment, for at least some operating conditions the first switch of the first half-bridge circuit and the second switch of the second half-bridge circuit are modulated on and off together and the second switch of the first half-bridge circuit and the first switch of the second half-bridge circuit are modulated on and off together.

In one aspect, a power conversion circuit configured to receive a direct current (DC) voltage signal at an input port and to provide an alternating current (AC) current signal at an output port includes an inverter circuit configured to receive the DC voltage signal to provide an inverter AC signal. A transformer circuit is coupled to receive the inverter AC signal at a first port thereof and provide a scaled version of the inverter AC signal to an energy buffer circuit which is series coupled between the transformer and a cycloconverter. The energy buffer circuit receives the scaled AC signal from the transformer circuit and enables said inverter to operate at constant power. The cycloconverter receives an AC signal through the buffer circuit and frequency converts the scaled inverter AC signal to provide the AC signal at the power conversion circuit output port. In one embodiment, the transformer circuit provides a voltage gain characteristic and an impedance shaping characteristic to signals provided thereto. In one embodiment, the cycloconverter is provided from a first half-bridge circuit.

In one aspect, a power conversion circuit configured to receive a direct current (DC) voltage signal at an input port and to provide an alternating current (AC) current signal at an output includes an inverter circuit configured to receive the DC voltage signal to provide an inverter AC signal. An energy buffer circuit is series coupled between the inverter circuit and a transformer. The energy buffer circuit receives the inverter AC signal from the inverter circuit and enables said inverter to operate at constant power. The transformer circuit is coupled to receive the inverter AC signal (through the energy buffer circuit) and provide a scaled version of the inverter AC signal to a cycloconverter. The cycloconverter receives the scaled inverter AC signal and frequency converts the scaled inverter AC signal to provide the AC signal at the power conversion circuit output port. In one embodiment, in response to a changing voltage of the AC signal provided to the cycloconverter, the cycloconverter modulates the transfer of high frequency resonant current between its input and output ports. In one embodiment, in response to a changing voltage of the inverter AC signal provided to the energy buffer circuit, the energy buffer circuit absorbs or delivers power to a storage port which compensates for a power mismatch between the pair of input and output terminals port of the power conversion circuit. In one embodiment, the transformer circuit provides a voltage gain characteristic and an impedance shaping characteristic to signals provided thereto. In one embodiment, the cycloconverter comprises first and second half-bridge circuits. In one embodiment, the first and second half-bridge circuits correspond to first and second unidirectional voltage blocking half-bridge circuits coupled in a back-to-back configuration. In one embodiment, the cycloconverter is configured to control a phase-shift between a resonant current and a synthesized half-bridge voltage of at least one of: the buffer circuit or the cycloconverter such that the cycloconverter manages power transfer between said buffer circuit and the cycloconverter.

In one aspect, a power generation system includes a photovoltaic (PV) panel to generate direct current (DC) power; and a power converter circuit having an input port configured to receive the direct current (DC) power from the PV panel and an output port at which an alternating current (AC) voltage signal is provided. The power converter circuit includes an inverter having a first port coupled to the input port of the power converter circuit and having a second port, a transformation stage having a first port coupled to the second port of the inverter and having a second port and a cycloconverter having a first port coupled to the second port of the transformation stage and having a second port coupled to the output port of the power converter circuit. In one embodiment, the cycloconverter is realized as a pair of unidirectional voltage blocking half-bridge circuits coupled back-to-back.

In one aspect, an energy buffer circuit series coupled between a transformer circuit and a cycloconverter is configured to receive an AC signal from the transformer circuit and enables an inverter to operate at constant power.

In one aspect, an energy buffer circuit series coupled between an inverter and a transformer circuit is configured to receive an AC signal from the inverter circuit and enable the inverter to operate at constant power.

In one aspect, a photovoltaic (PV) micro-inverter circuit, having a direct current (DC) port and an alternating current (AC) port includes an inverter having a first port coupled to the DC port of the PV micro-inverter circuit and a second port coupled to a first port of a transformation stage. The transformation stage and inverter are configured to transform a DC signal provided to the first port of said inverter into an AC signal at a second port of the transformation stage. A cycloconverter has a first port coupled to the second port of the transformation stage and a second port corresponding to the AC port of the PV micro-inverter circuit. In one embodiment the cycloconverter is provided from two unidirectional voltage blocking half-bridge circuits coupled back-to-back. In one embodiment the cycloconverter circuit includes first and second half-bridge circuits and the first and second switches of the first half-bridge circuit are biased into their conduction states and the first and second switches of the second half-bridge are modulated and wherein for a second different range of an output voltage signal provided at the output of the cycloconverter circuit, the first and second switches of the second half-bridge circuit are biased into their conduction states and the first and second switches of the first half-bridge circuit are modulated.

BRIEF DESCRIPTION OF THE DRAWINGS

The foregoing features of the concepts, systems, circuits and techniques described herein may be more fully understood from the following description of the drawings in which.

DETAILED DESCRIPTION OF THE PREFERRED EMBODIMENTS

Before describing a circuit which receives DC power from a source and inverts it to AC power, some introductory concepts are explained. It should be appreciated that reference is made herein to power conversion circuits (or more simply "power converters") coupled to a DC source corresponding to one or an array of photovoltaic (PV) panels or modules. It should be appreciated that the power converters as well as the concepts described herein are not limited to use with PV panels. Rather, the power converters and concepts described herein may be used with a wide variety of elements which act as DC signal sources including, but not limited to microhydroelectric turbines, micro wind turbines, fuel cells, batteries. Accordingly, it should also be appreciated that power conversion circuits described herein may be configured to operate with a wide range of different DC signal sources and are not limited to operation with DC signals generated by PV panels or PV circuits or systems in general.

It should also be appreciated that reference is also made herein to a power conversion circuit (or more simply a "power converter") which receives a DC signal from a PV panel and provides an AC output signal having a frequency and a voltage suitable for use with an electric grid. It should be appreciated that the power converter and concepts described herein can be used to provided AC signals having a wide variety of frequencies and signal levels and the circuits and concepts described herein are not in any way limited to use with an AC signal having a particular frequency or a particular signal level or even for use with a particular signal level. It should also be appreciated that while reference is sometimes made herein to a power converter input port and output port, the described approach is applicable both to transferring power from DC to AC and from AC to DC (i.e., power may be transferred from the "input port" to the "output port" or from the "output port" to the "input port"). The concepts described herein can be used for power converters that act as an "inverter", as a "rectifier", or as both (wherein, in general, a DC-to-AC system is referred to as an inverter, an AC-to-DC system is referred to as a rectifier and something either/or may be referred to as a converter). Thus, for example, the power conversion systems according to the principles introduced herein can be used for power supplies to providing DC output power when supplied from an electric grid. It should thus be appreciated that the concepts, systems, circuits and techniques described herein find use in a number of different systems including systems that process power from the AC side to the DC side. Applications include power supplies connected to an AC power grid.

Figure 1:
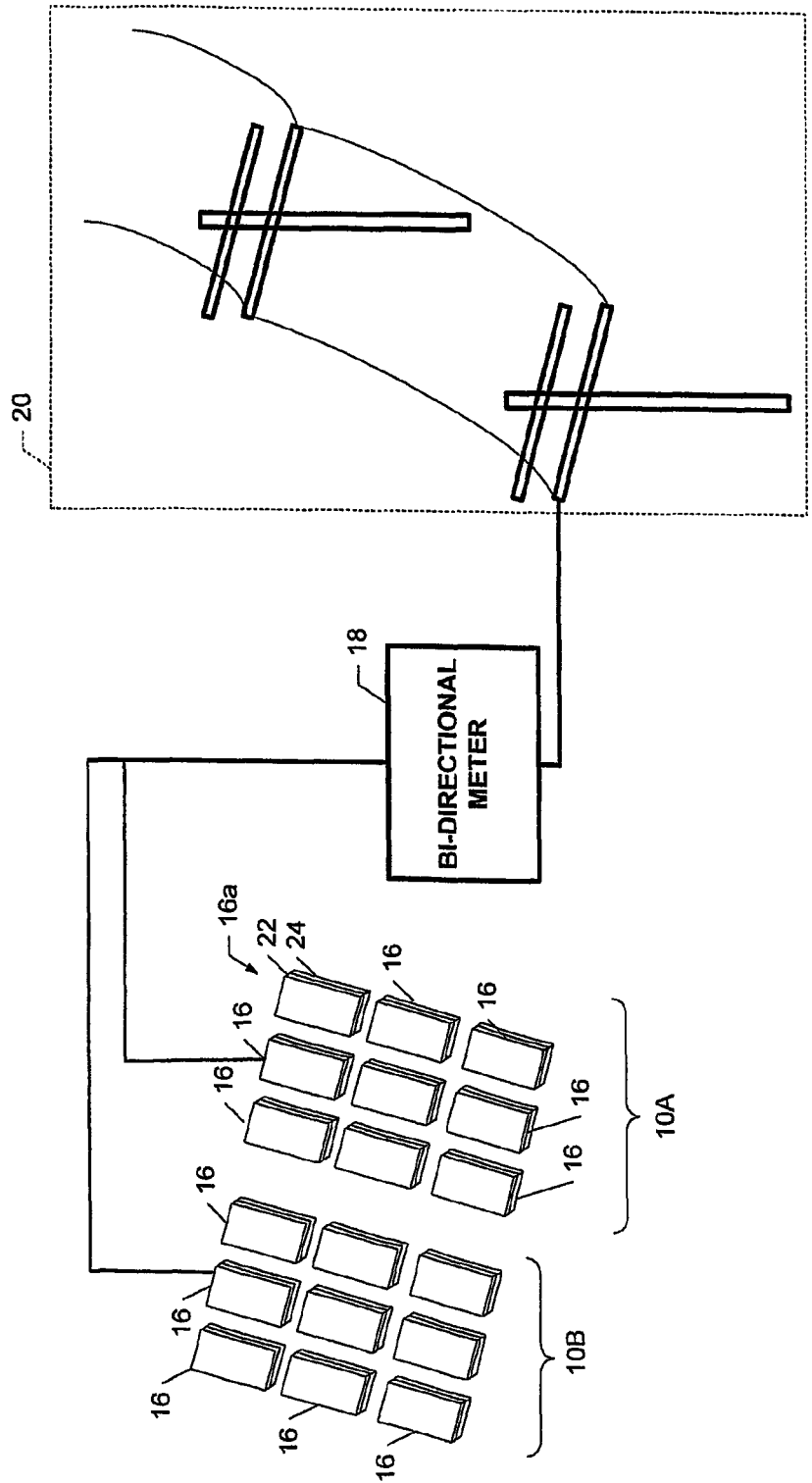
FIG. 1 is a block diagram of an array of grid-connected photovoltaic (PV) panels with each PV module having a microinverter coupled thereto.

Referring now to FIG. 1, first and second arrays 10a, 10b of photovoltaic (PV) panel assemblies 16 are coupled through an optional bi-directional meter 18 to a power grid 20 (or more simply a "grid"). Meter 18 may be provided as an electricity meter, a power meter or any other type of meter which can measure or otherwise determine the amount of electricity, power or energy being provided by or received by the PV system. Significantly, meter 18 operates in both directions since at some points in time, the system may draw electricity from grid 20 and at other points in time, the system may supply electricity to grid 20.

Each PV panel assembly 16 includes a PV panel 22 (also sometimes referred to herein simply as a "panel") and a power conversion circuit 24 coupled thereto. Power conversion circuit 24 is also sometimes referred to herein as a "power converter," a "micro-inverter," a "module integrated converter (MIC)" or more simply, a "converter."

Each PV panel 22 receives solar energy and converts the solar energy to a direct current (DC) voltage signal available at a pair of output terminals of the PV panel 22. Since grid 20 is compatible with AC voltage signals at a line frequency, it is necessary to convert the DC voltage provided by each PV panel 20 to an AC voltage. Thus, power conversion circuit 24 performs such a conversion.

An AC signal resultant from power conversion circuit 24 is then coupled to an electric power grid 20 (or more simply, a "grid"). In this particular embodiment, the AC signal is coupled to the grid through meter 18.

Figure 2:
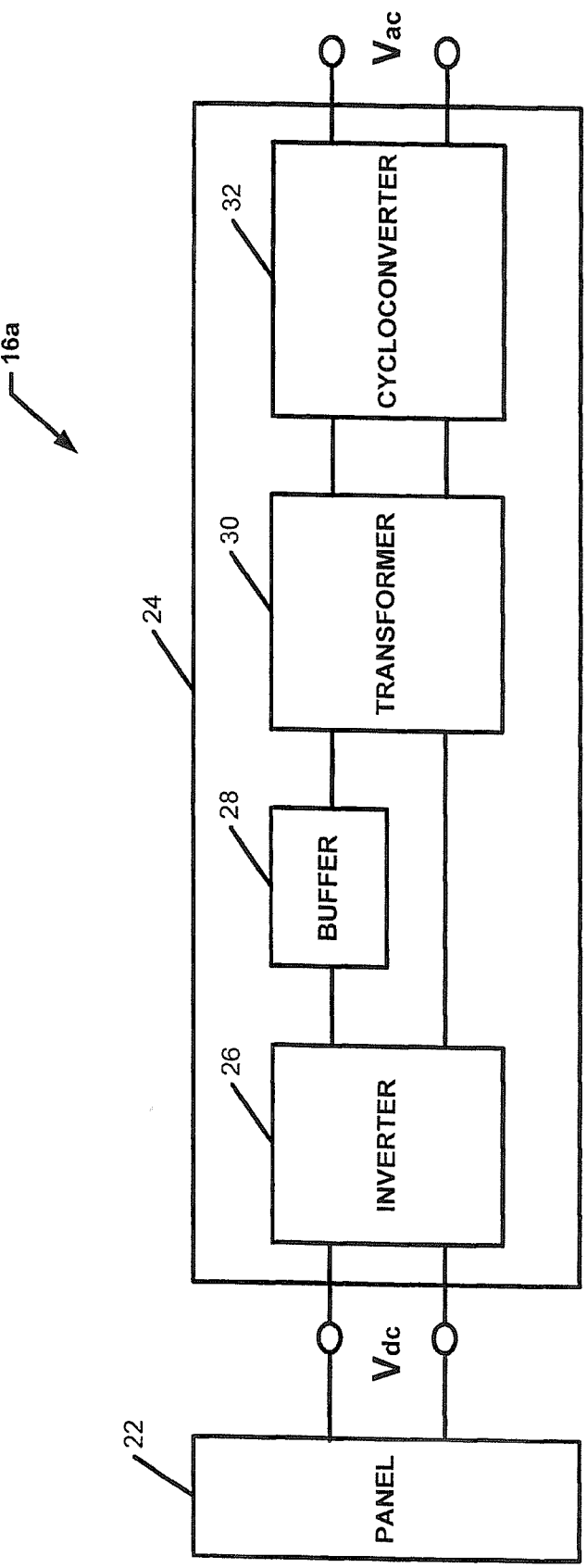
FIG. 2 is a block diagram of a PV panel coupled to a power converter having a series buffer block (SBB) architecture.

Referring now to FIG. 2 and taking PV panel assembly 16a as representative of panel assemblies 16 in FIG. 1, PV panel 22 provides a DC output voltage $V_{DC}$ across a pair of panel output terminals (or a panel output "port") of power conversion circuit 24. Power conversion circuit 24 is provided having a so-called series buffer block (SBB) architecture and includes an inverter circuit 26 having a pair of input terminals (or an inverter input port) corresponding to the input port of the power conversion circuit and having a pair of output terminals (or an inverter output port). Inverter circuit 26 is configured to receive an input DC voltage signal at the input port and provide an AC signal at the output port.

Power conversion circuit 24 further includes an energy buffer circuit 28 (sometimes referred to herein as a buffer circuit or more simply a buffer). It should be appreciated that buffer circuit 28 is a two terminal or one port device connected in series between inverter 26 and transformer 30. Energy buffer circuit 28 is configured to receive the AC signal provided thereto from inverter 26 coupled the signal to a terminal on a low voltage side of transformer circuit 30. Buffer circuit 28 enables inverter 26 to operate at constant power by absorbing and delivering the difference in local average power (e.g., local average over a switching cycle) between that optimally provided by a DC source such as panel 22 (or delivered into the power converter DC port) and that desired for the AC grid (or delivered to the power converter AC output port), optionally including energy used to provide reactive power to the AC grid. If, for example, it is desired to source a constant power P at the DC port, and deliver this as average power to the AC grid voltage $V\sin(\omega t)$ at unity power factor, the power delivered to the grid must therefore be $2P(\sin(\omega t))^2 = P(1-\cos(2\omega t))$. The buffer block is thus controlled to absorb a power $P\cos(2\omega t)$. The energy storage element of the buffer block must thus be rated to absorb the peak energy swing associated with $P\cos(\omega t)$ which is an amount of energy $|P|/\omega$. For reverse power flow, the same holds true, but with opposite sign of power P. In steady-state operation, this local average power will vary at substantially twice the line frequency (e.g., 120 Hz in the United States). Buffer 28 also serves to change the effective loading of the inverter, reducing its required operating range.

Transformer 30 is configured to receive the AC signal provided thereto by inverter 26 (and through series connected buffer block 28) and to provide voltage scaling of the AC signal. Thus, the DC connected inverter transforms the DC voltage from a DC source into high frequency AC with the transformation stage providing both voltage gain and appropriate impedance shaping. The transformer circuit also electrically isolates the inverter circuit from the remaining portions of the power conversion circuit.

Power conversion circuit 24 further includes a cycloconverter 32 having a pair of input terminals (also referred to as an input port) coupled to the output port of transformer 30. The cycloconverter circuit is configured to receive an AC signal from the high voltage side of transformer 30 frequency downconverts the AC signal such that the AC signal is provided having a predetermined frequency at the pair of output terminals (or output port) of the cycloconverter. Ideally, cycloconverter 32 provides an AC signal having a frequency which substantially matches a desired frequency of another system (e.g. the power grid) coupled to the cycloconverter output port.

The cycloconverter is controlled to modulate the transfer of high frequency resonant current in response to the changing voltage of the AC port of power conversion circuit 24; buffer stage 28 acts in a similar manner, but is controlled to absorb or deliver power to the storage port which compensates for the power mismatch between DC and AC ports. Cycloconverter 32 converts the AC waveform provided thereto from transformer 30 to another AC waveform of a different (e.g. lower or higher) frequency, synthesizing the output waveform from segments of the AC supply without an intermediate direct-current link.

Figure 2A:
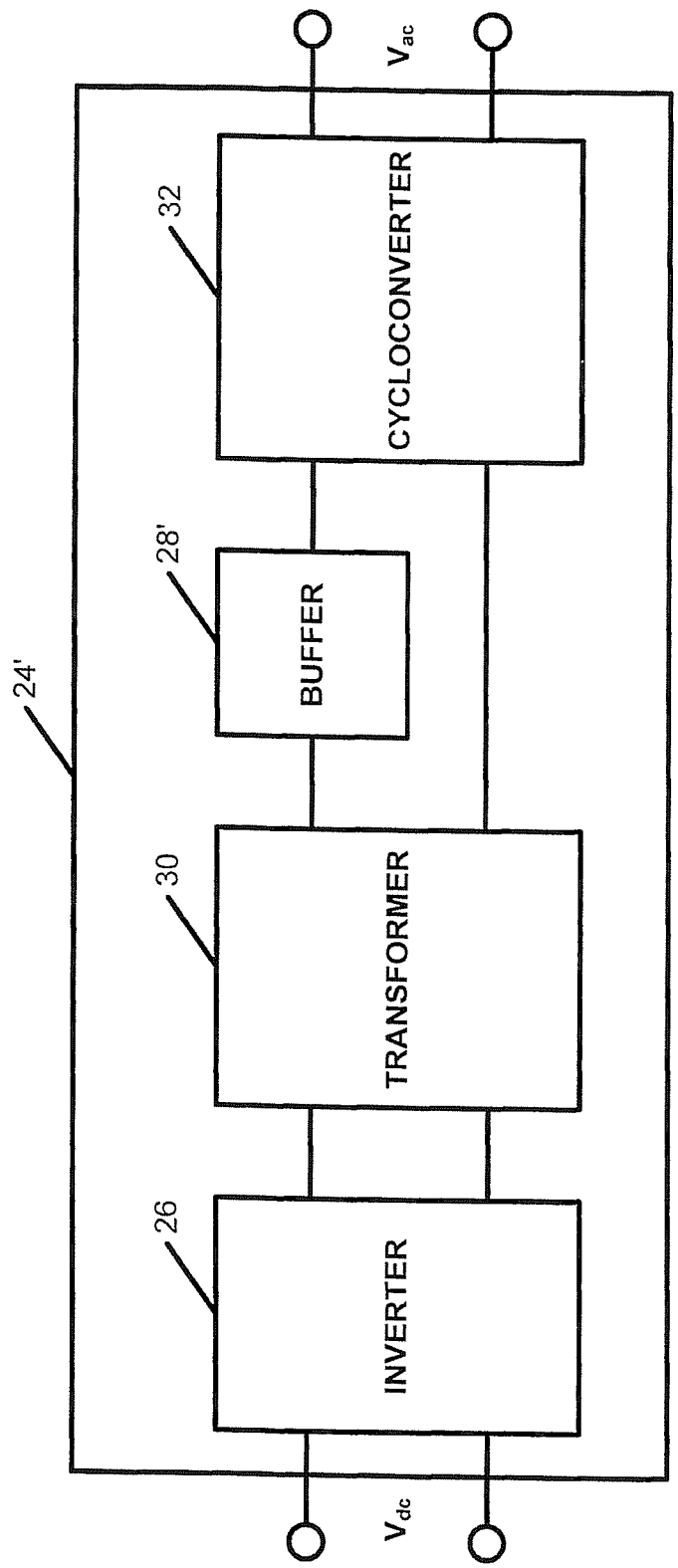
FIG. 2A is a block diagram of a power converter having an alternate series buffer block (SBB) architecture.

Referring now to FIG. 2A in which like elements of FIG. 2 are provided having like reference designations, a power conversion circuit 24' is provided having a series buffer block (SBB) architecture and includes inverter circuit 26 having an input port corresponding to the input port of power conversion circuit 24' and having an output port. Inverter circuit 26 is configured to receive an input DC voltage signal at the input port and provide an AC signal at the output port.

In this embodiment, transformer 30 is coupled directly to inverter 26 and buffer circuit 28' is series coupled between transformer 30 and cycloconverter 32. Thus, the cycloconverter input port is coupled to the transformer through buffer circuit 28' and the cycloconverter output port is coupled to the output port of the power conversion circuit (and in the embodiment shown in FIG. 2A, the cycloconverter output port corresponds to the output port of the power conversion circuit). Those of ordinary skill in the art will appreciate that, as compared with the embodiment of FIG. 2, the voltage and current ratings of the devices change, as would be expected, as does the required volt-seconds rating of transformer 30.

It should be appreciated that in comparison to existing designs, the series buffer block topologies described in conjunction with FIGS. 2 and 2A effectively place all major power processing blocks, (e.g. the high-frequency inverter, buffer and cycloconverter) in a series path with respect to the high-frequency resonant current. As discussed above, "effectively" implies accounting for current scaling of the transformer and neglecting the contribution of parasitics such as transformer magnetizing current. This allows power-flow to be modulated in each stage by simply modifying the switching function relative to the current, achieving zero voltage switching (ZVS) for all devices. In particular, as illustrated in FIGS. 2 and 2A, buffer is disposed so as to be electrically in series with at least two of an inverter output port, a transformer low-voltage port, a transformer high-voltage port, and a cycloconverter input port.

Since the series buffer block approach described herein can be implemented with devices having resistive on-state drops which can be reduced as device technology improves, the configurations described in conjunction with FIGS. 2 and 2A present a clear opportunity to scale with improvements in semiconductor technology, such as silicon-carbide and gallium-nitride devices.

It should be appreciated that this is in contrast to many other conventional topologies which operate with fixed on-state voltage drop devices, whose loss does not appreciably improve as technology scales forward.

Figure 3:
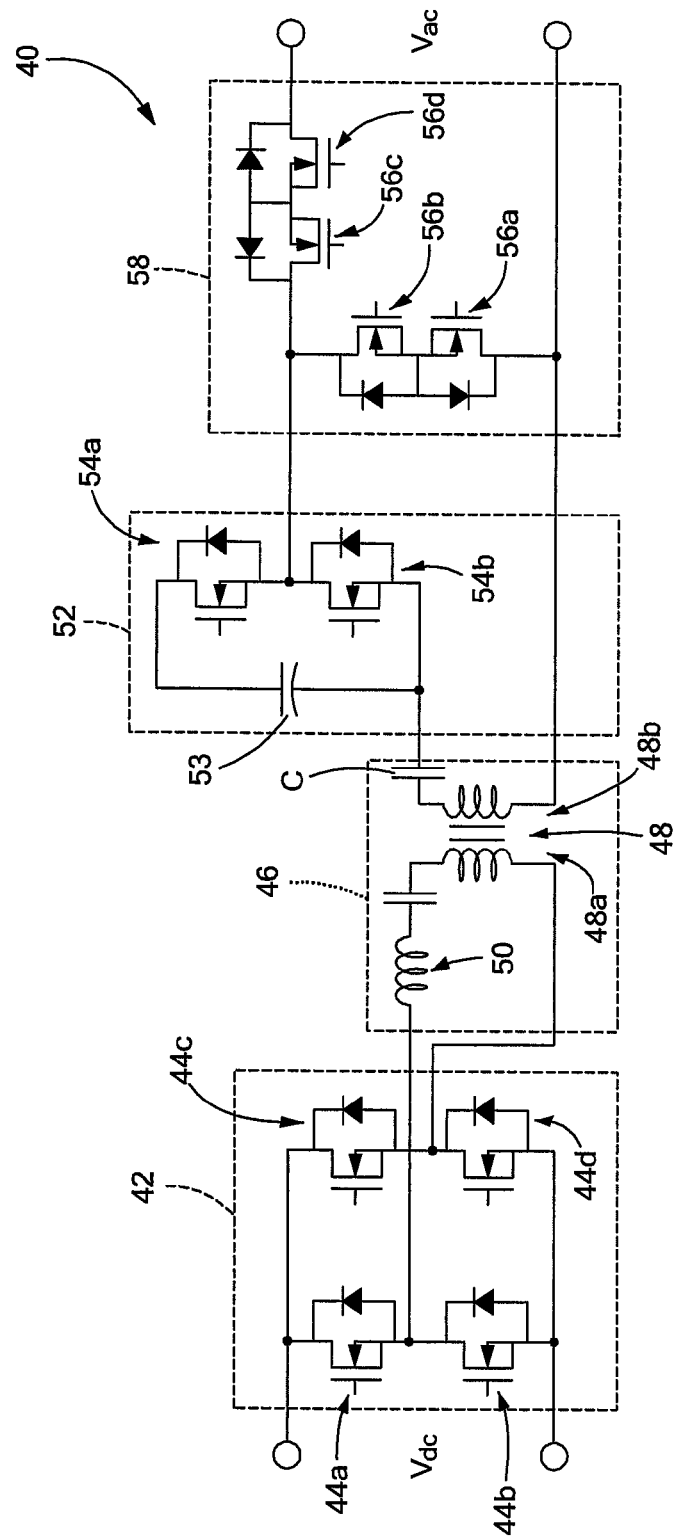
FIG. 3 is a schematic diagram of a PV power converter circuit having a series buffer block (SBB) architecture.

Referring now to FIG. 3 a converter circuit 40 includes an inverter 42 provided from four low-voltage devices 44a-44d configured to provide inverter 42 as a full-bridge inverter. Inverter 42 is coupled to a transformation stage 46 here shown comprised of a transformer 48 having a low voltage side 48a and a high voltage side 48b and a resonant tank circuit 50. It should be appreciated that although tank circuit 50 is shown as part of transformation stage 46, tank circuit 50 could also be shown as being part of inverter 42. A buffer circuit 52 coupled to transformation stage 46 is here illustrated as a half-bridge series buffer, comprising a buffer capacitor 53 and a pair of switching devices 54a, 54b, here corresponding to high-voltage devices 54a, 54b since buffer 52 is coupled to the high voltage side of transformer 48. Four high-voltage devices 56a-56d are configured to provide a bi-directional half-bridge cycloconverter 58 coupled to buffer circuit 52. It should be appreciated that in this exemplary embodiment, half-bridge buffer 52 is positioned on a secondary side of a transformation stage, substantially reducing the volt-second magnitude imposed on the transformer. It should also be appreciated that in this exemplary embodiment, series resonant tank circuit 50 is placed on the low-voltage side of the transformer. Placing the resonant tank on the low-voltage side of the transformer reduces parasitic ringing with the parasitic capacitance across the transformer secondary winding.

Additionally, the configuration of FIG. 3 includes capacitors on both sides of the transformer with the secondary side capacitor C functioning as a DC block for the half-bridge. Alternatively, as described above in conjunction with FIG. 2, the buffer-stage can be placed on the low-voltage size of the transformer, particularly if improved energy storage and semiconductor devices are available which offset the gains obtained by its placement on the high-voltage side. Alternatively, as will be discussed below in conjunction with FIG. 3A, the resonant tank can be placed on the high-voltage side of the transformer. Also, other resonant tanks structures such as are known in the art could be employed, including parallel, series-parallel, LCL, LLC, LLCC, immittance converters, or other resonant tank structures, and these tank structures can optionally incorporate transformer parasitic elements such as transformer leakage inductance and parasitic capacitance.

The power flow in the converter, specifically the buffer-stage and cycloconverter, can be controlled through two related switch modulation methods in combination with the selection of the resonant current magnitude. Over a line cycle, this allows for four distinct operational strategies which can combined to obtain hybrid schemes which may provide improved performance and/or efficiency for a given operating condition.

Additionally, control over the switching frequency can be used to widen the input and output voltage operating ranges for a given set of load requirements. Exemplary switching schemes are described below. These switching schemes are in addition to additional control methods that can be used to adjust average power delivery, such as burst-mode or on-off control at a frequency below the switching frequency and above the line frequency, or by bursting on and off for individual line cycles.

For a given current magnitude, managing the power transfer among the buffer stage and cycloconverter (and by consequence, the inverter) can be accomplished by two different methods as described below. In a first method, control is exerted over the phase-shift between the resonant current and synthesized half-bridge voltage (e.g. of the buffer stage and/or cycloconverter). In the second method, managing the power transfer among the buffer block and cycloconverter is accomplished by controlling the on-time of the high-side switch using pulse-width-modulation.

Figure 3A:
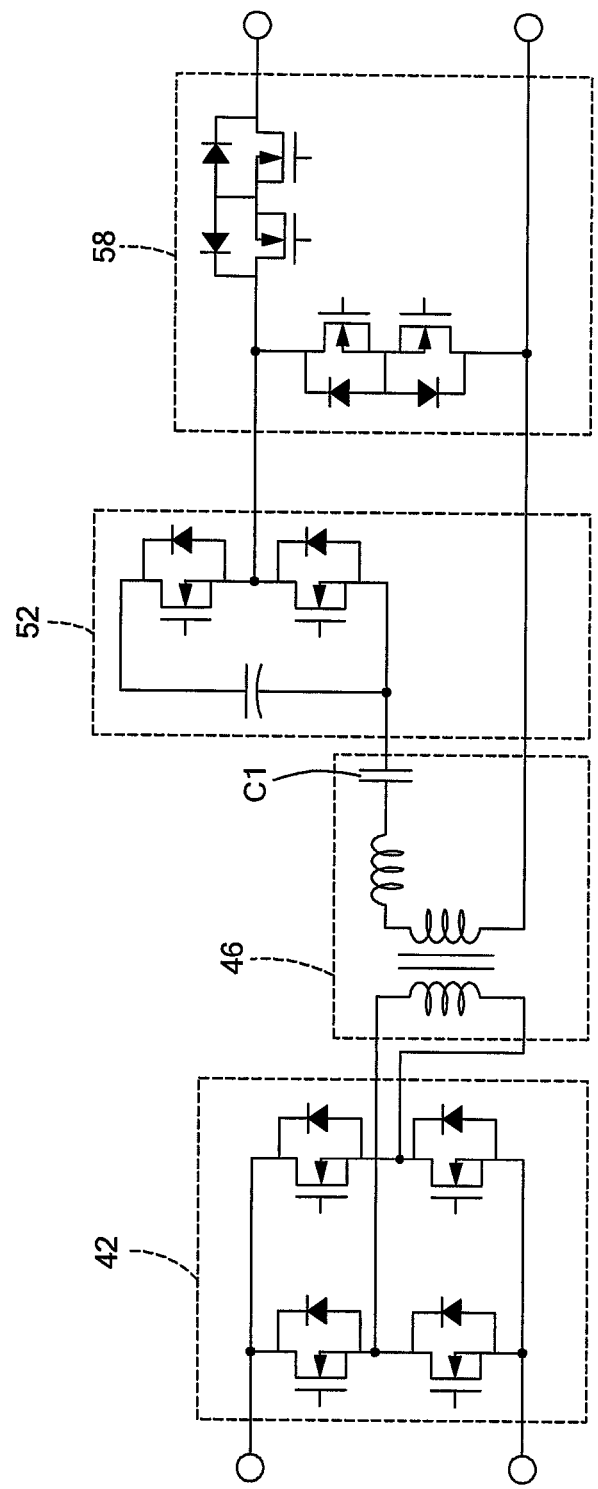
FIG. 3A is a schematic diagram of an alternate embodiment of a PV power converter circuit having a series buffer block (SBB) architecture.

Although not explicitly shown in FIG. 3 or 3A, control is realized via one or more controllers which provide combinations of phase-shift and pulse-width modulation and frequency control of the inverter, buffer circuit and phase shift of the cycloconverter with respect to the full bridge, and pulse-width modulation cycloconverter half-bridges. Additional control of average power delivery can be obtained with on-off or burst mode control at a frequency below the switching frequency and above the line frequency and/or by bursting on and off for individual line cycles. Control circuits are shown and further described in conjunction with at least FIGS. 7-9 below.

Referring now to FIG. 3A in which like elements of FIG. 3 are provided having like reference designations, in this embodiment the resonant tank 50' is placed on the high-voltage side of the transformer and capacitor C1 functions as a DC block for the half-bridges and permits use of a higher energy density characteristic of high-voltage capacitors in the buffer. As discussed above, in alternative embodiments, the buffer-stage can be placed on the low-voltage size of the transformer.

Power flow in the converter can be controlled through the two different switch modulation methods in combination with the selection of the resonant current magnitude as discussed above in conjunction with FIG. 3.

In comparison to existing designs, the topology described in conjunction with FIG. 1 effectively places all major power processing blocks, (e.g. the high-frequency inverter, buffer and cycloconverter) in a series path with respect to the high-frequency resonant current. This allows power-flow to be modulated in each stage by simply modifying the switching function relative to the current, achieving zero voltage switching (ZVS) for all devices.

The placement of each stage in series with the drive current seems, at first glance, to impose a heavy conduction loss penalty. However, using unipolar devices such as metal oxide semiconductor field effect transistors (MOSFETs) and implementing ZVS for the primary switches, allows the semiconductor area to be scaled up to reduce conduction loss.

It should be appreciated that this is in opposition to devices such as IGBTs, SCRs, and diodes which operate with a fixed on-state voltage drop, an intrinsic property of the devices, which is not scalable.

Figure 4A:
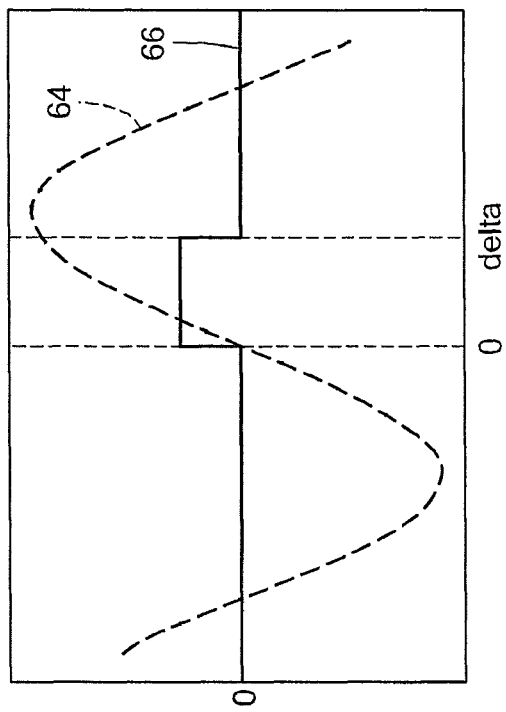
FIG. 4A is a plot of a power modulation switching waveform resultant using a pulse width modulation technique.
Figure 4:
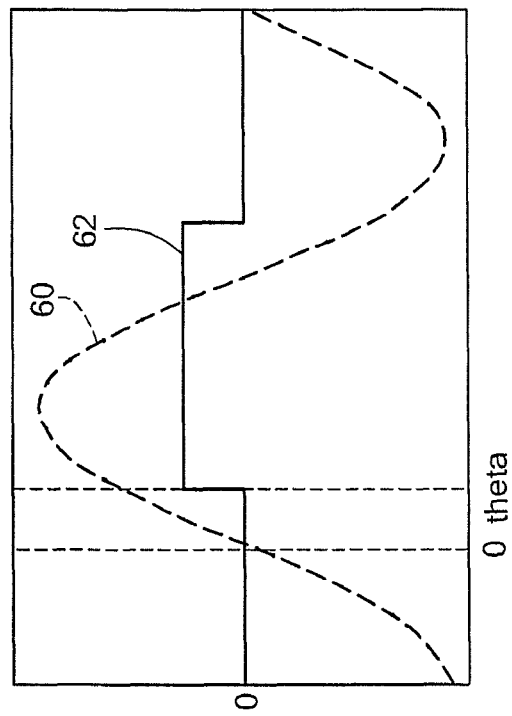
FIG. 4 is a plot of a power modulation switching waveform resultant using a phase shift technique.

Referring now to FIG. 4, curves 60, 62 illustrate exemplary results of the first method for managing the power transfer among the buffer block and cycloconverter are shown (i.e. exerting control over the phase-shift between the resonant current and synthesized half-bridge voltage).

Referring now to FIG. 4A, curves 64, 66 illustrate exemplary results of a second method for managing the power transfer among the buffer block and cycloconverter are shown (i.e. managing the power transfer among the buffer block and cycloconverter by controlling the on-time of the high-side switch using pulse-width-modulation).

It should be appreciated that the first and second methods discussed above in conjunction with FIGS. 3, 3A, 4 and 4A are not mutually exclusive, and both methods can be implemented while still providing soft-switching transitions. Moreover, it should be appreciated that the proposed switching waveform control may be based directly on the current waveform, but can also be realized indirectly. One method for doing this is selecting relative phases of the switching timing patterns of the full-bridge inverter, the buffer block converter and the cycloconverter such that the desired switching relationships and current waveform are achieved. It should also be appreciated that the switching frequency itself is an additional control variable along with phase shift and pulse width control. As switching frequency is varied, the apparent tank impedance is varied, enabling control over power. One may vary one or all of these controls together to get a desirable output at high efficiency.

One basis for the phase-shift modulation method is to maintain a balanced 0.5 duty cycle for each switch (minus any dead-time). Given a current waveform as a reference, shifting a relative phase of the half-bridge switching function, and thus the applied voltage waveform, the magnitude of the real power can be controlled. Control over the real power in this manner has the side-effect of introducing reactive power at the switching frequency, which is at a maximum when the voltage and current waveforms are in quadrature.

As mentioned above, an alternative method to control switch on-time is through pulse-width modulation (PWM), a ubiquitous method for fixed frequency operation. Implementation of this scheme is accomplished by utilizing the lower switch, S1, as a bypass and only enabling the top switch, S2 for the duration required for the appropriate energy transfer. Like the phase-shift modulation, PWM also results in reactive power transfer at the switching frequency, albeit substantially reduced.

These two modulation methods result in significantly different voltage patterns imposed on the transformation stage for equal power transfer. From an equivalent impedance perspective, both methods present the same effective resistance but different reactances.

Figure 5:
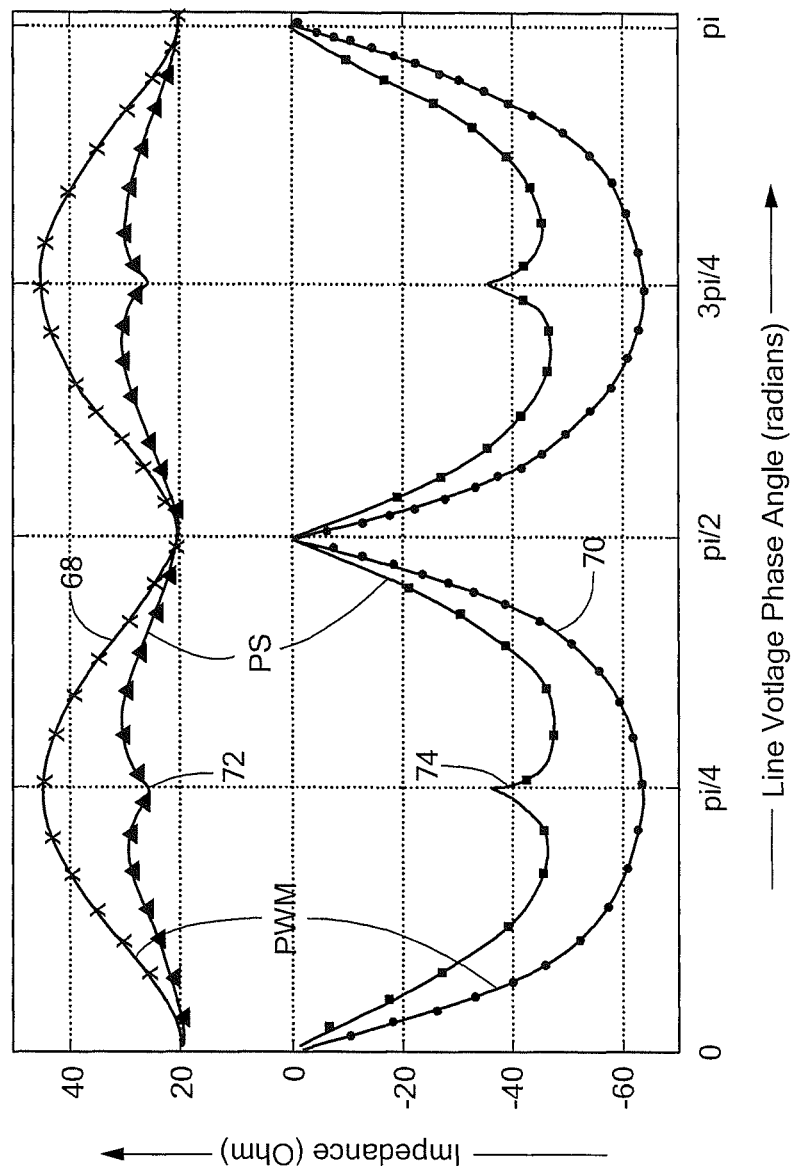
FIG. 5 is a plot of cycloconverter impedance as seen by an inverter in response to both phase shift and pulse width modulation (PWM) techniques.

Referring now to FIG. 5, an effective impedance seen by the inverter when looking into the buffer-block/cycloconverter combination is shown for both phase-shift and pulse-width modulation schemes respectively. Curves 68, 70 illustrate an effective impedance (real portion denoted by curve 68 and reactive portion by curve 70) for a PWM scheme and curves 72, 74 illustrate an effective impedance (real portion denoted by curve 72 and reactive portion by curve 74) for a phase shift scheme. As can be seen from FIG. 5, both the phase-shift and PWM power modulation schemes result in a varying fundamental voltage magnitude and phase, however the PWM method results in significantly higher harmonic content (of the switching frequency) than the phase-shift method.

The current envelope for the converter operation is an abbreviated reference to the magnitude of the fundamental component of the high-frequency resonant current, a quantity that can be controlled as necessary to meet the power transfer and impedance requirements of the system. An analysis of two envelopes is presented here, the first with a constant current maintained over the line cycle, and the second operated with the minimum current required to maintain the power transfer requirements.

The constant-current drive method operates with a fixed magnitude high-frequency ac current over a line cycle; the chosen magnitude being the peak of the current needed in the line cycle. This maximum occurs at both the peak and the zero crossing of the line voltage, if the buffer capacitor voltage is selected to be constant at one-half the peak line voltage. If the buffer capacitor voltage is chosen to be a different value or allowed to vary over a line cycle, the peaks may occur elsewhere. Outside of the time where the peak current is required, both blocks reduce their power transfer, by means of an increased phase-shift and/or reduced pulse width, which presents a time varying reactive impedance to the high-frequency inverter which should be taken into account.

Alternatively, the minimum current drive envelope method adapts the resonant current magnitude over a line cycle, reducing current during the line cycle where both the buffer block and cycloconverter operate with a phase shift or reduced pulse width. This mode of operation significantly reduces the root mean square (RMS) current, and thus conduction loss, in the series connected blocks. It additionally reduces the magnitude and variation of reactive impedance presented to the high-frequency inverter compared to the constant-current operation.

Figure 6:
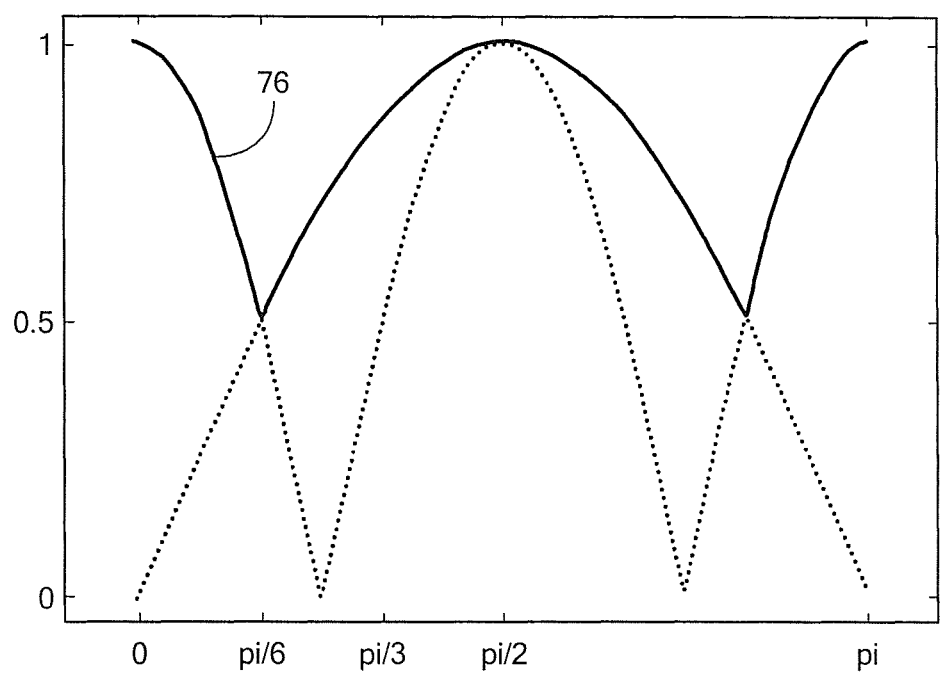
FIG. 6 is a plot of a current magnitude envelope.

The resulting current envelope is illustrated as curve 76 in FIG. 6, where the buffer-block capacitor voltage has been selected to be half of the peak line voltage.

As discussed above, the converter topology described herein is intended to avoid the non-scalable losses of diode and IGBT devices, in favor of resistive channel FET devices. The choice of these devices has benefits beyond simply scaling device area to reduce loss. MOSFET device figure-of-merit values have improved steadily, and the recent use of charge-compensation principles has allowed high-voltage silicon MOSFETs to surpass the "silicon limit" and become viable choices for voltage ranges once relegated to IGBT devices alone. Additionally, the emergence of wide-bandgap based devices, implemented in silicon carbide (SiC) and gallium nitride (GaN), have the potential to dramatically reduce the on-state resistance of devices even further while reducing parasitic capacitance, inductance and resistance values. The historical semiconductor device progress, combined with these and other anticipated improvements, are a motivating factor in this work, along with the elimination of p-n junction drop devices.

In selecting the energy storage capacitor for the buffer stage and its operating voltage range, two things are preferably considered: (1) the equivalent series resistance of the capacitor, and the peak voltage swing over a line cycle; and (2) the increase of either increases the loss proportionally. For this reason, it is advantageous to use the highest energy density and lowest ESR capacitors that will fit into the available space. The type that have been initially selected for use in the buffer block are high-voltage electrolytic capacitors. These capacitors are widely available and have extremely high energy densities, but have a number of limitations. Their long term survival rate, influence from temperature, and relatively large equivalent series resistance (ESR) place limits on their effectiveness and efficiency for use as the bulk energy storage.

The flexibility of the buffer block design allows the voltage on the buffer capacitor to be selected as desired, even allowing it to rise and fall significantly over a line cycle as it charges and discharges respectively. Allowing a high voltage ripple permits the use of a much lower total energy storage than would otherwise be required, provided a capacitor with an appropriate ESR is used. For example, this would allow the use of film capacitors, which are rated to have higher reliability and environmental robustness, but much lower energy density than electrolytic capacitors.

The high frequency resonant inverter connected to the dc port of the converter has been shown thus far as a full bridge topology. This structure provides twice the voltage magnitude of a half-bridge structure, and allows for the use of convenient and well studied control methods and a wide operating range. Other topologies can be used, and may be more suited for alternative design requirements. One factor to consider in the inverter design (and transformation stage, if required) is the ability to generate a controllable ac current which can be circulated through the buffer-stage and cycloconverter. It may, but is not required to, handle bidirectional power flow provided the buffer-block contains enough energy storage when the converter is operating in four-quadrant mode. Topologies which may be appropriate for these requirements include, but are not limited to, half- and/or full-bridge, class-E/F/Φ variants, etc. Likewise, the resonant tank used to provide desired loading of the inverter switches (e.g., including for zero-voltage switching) is a series-resonant tank. Other tank topologies which may be appropriate for these requirements, but are not limited to, parallel resonant, series-parallel resonant, LLC, LCL, LLCC, etc. Moreover, the resonant tank may be designed so as to absorb one or more of the transformer parasitic elements, such as leakage inductance, magnetizing inductance, or parasitic capacitance.

The buffer-stage and cycloconverter circuits are shown in half-bridge configurations, however alternatives could be implemented with a requirement of supporting bi-directional power flow, and bidirectional voltage in the case of the cycloconverter. In this case, the half-bridge structures reduce the effective voltage across the transformer by a factor of two, reducing the applied volt-seconds and the required transformer turns ratio.

The half-bridge implementation of a bidirectional voltage blocking cycloconverter is achieved, for example, by replacing the unidirectional blocking switches with bidirectional ones.

Figure 7:
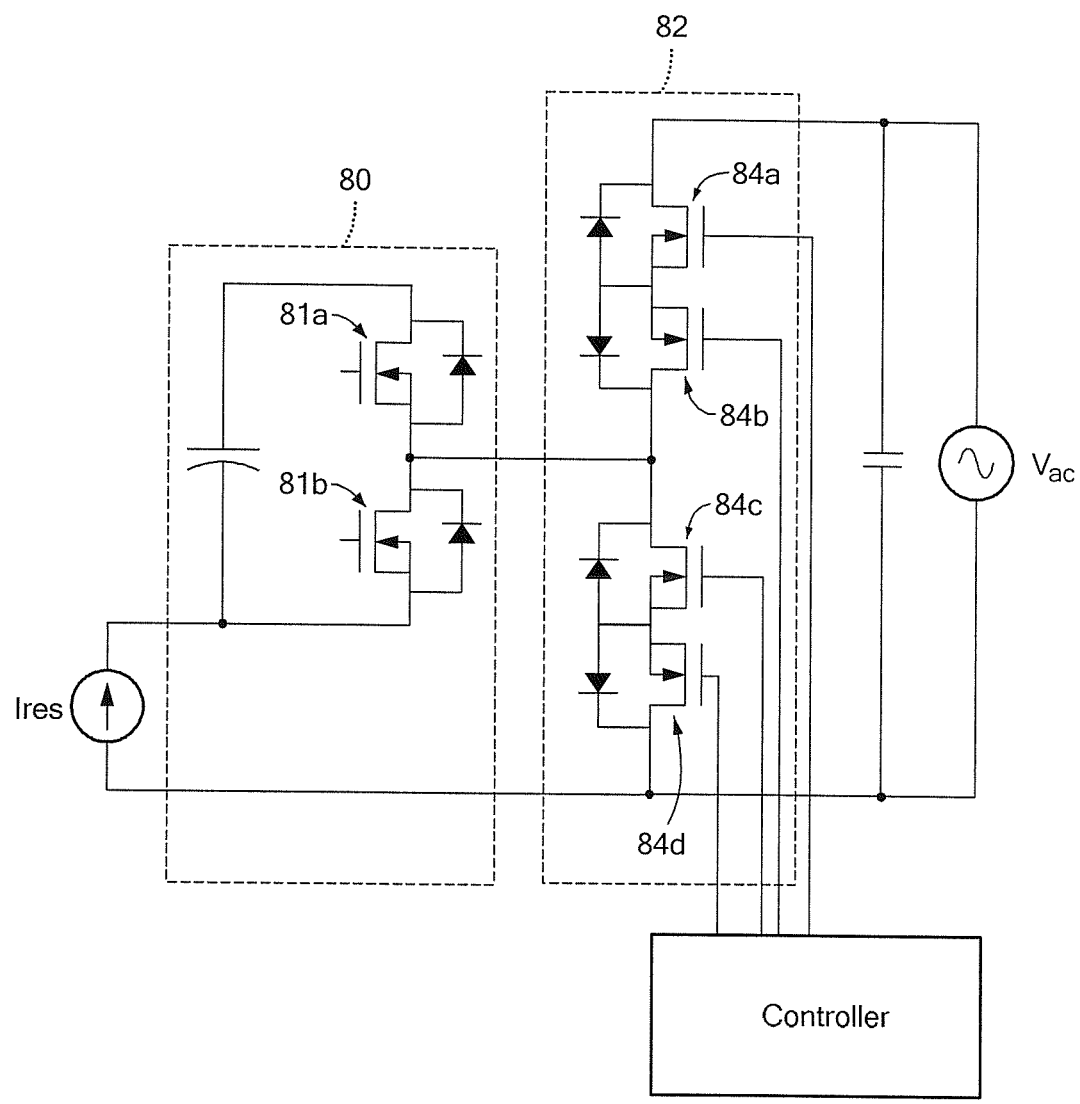
FIG. 7 is a schematic diagram of a half-bridge cycloconverter implemented with bidirectional voltage blocking switch configurations.

Referring now to FIG. 7, a buffer circuit 80 provided from field effect transistors (FETs) 81a-81b and an energy storage capacitor is series coupled to the input port of a bidirectional voltage blocking cycloconverter 82. In this exemplary embodiment, FETs 81a-81b are provided as metal oxide semiconductor field effect transistors (MOSFETs) although other types of FETs or even other types of switching elements may also be used. Cycloconverter 82 is also provided from a plurality of FETs 84a-84d. In this exemplary embodiment, FETs 84a-84d are provided as MOSFETs although other types of FETs or other types of switching elements may also be used. In the case of using MOSFETs, a bidirectional voltage blocking cycloconverter can be achieved by placing the MOSFETs back-to-back with a common source terminal, and sharing a single capacitive decoupling path as shown in FIG. 7. By connecting the MOSFETs with common-source, instead of common-drain, two low-side gate drivers can be used which share a common reference point. This allows the use of a single isolated supply for each bidirectional switch structure. When operating, this half-bridge implementation presents two MOSFETs in series with the resonant current at all times, which increases loss compared to the unidirectional voltage blocking half-bridge, which only has one MOSFET.

It should be appreciated that controller 85 provides appropriate control signals to the switching elements (e.g. to gate terminals of FETs 81a, 81b, 84a-84d). Those of ordinary skill in the art will appreciate that source and drain terminal connections have been omitted from FIGS. 7-9 for clarity in the figures and that a gate to source voltage ($V_{gs}$) is needed to switch the MOSFET between its "ON" and "OFF states and that the particular gate to source voltage ($V_{gs}$) to use depends upon the particular type of FET being used. Also, it should be understood that although only one controller 85 is shown in FIG. 7, controller 85 may be provided as a single circuit (e.g. as a single processor such as a digital signal processor (DSP)) or from a plurality of different and/or separate control circuits or processors.

Figure 8:
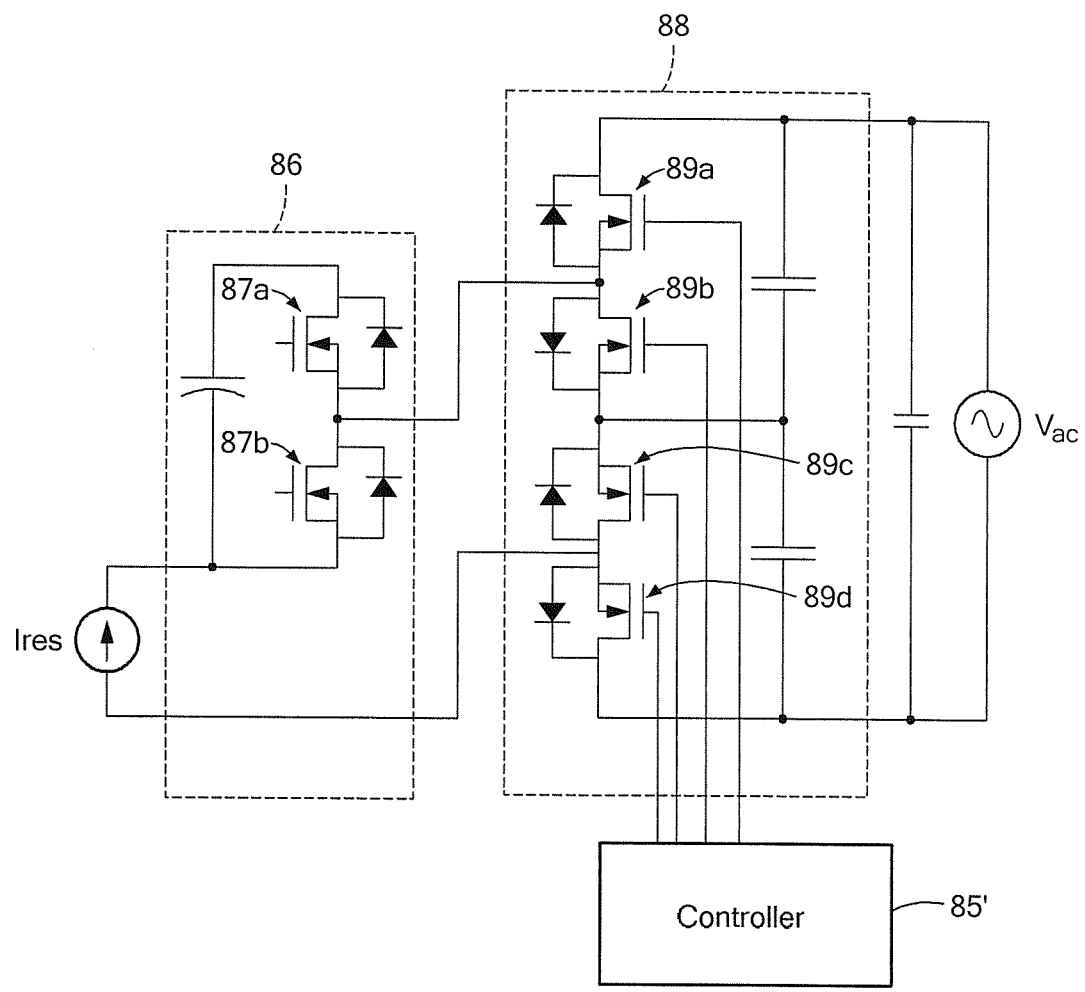
FIG. 8 is a schematic diagram of a buffer block and a dual half-bridge cycloconverter implemented with unidirectional voltage blocking switch configurations.

Referring now to FIG. 8, a buffer circuit 86 provided from switching elements 87a, 87b and an energy storage capacitor is series coupled to the input port of a cycloconverter 88 provided from a plurality of field effect transistors (FETs) 89a-89d and associated bypass capacitors. FIG. 8 illustrates an alternative implementation for the cycloconverter in which cycloconverter 88 can be recognized as two unidirectional voltage blocking half-bridge circuits placed back-to-back with a common source reference point. This allows the use of standard high-voltage IC gate drive circuitry for each half-bridge, with all devices and associated logic referenced to a single point. In normal operation, with a given (known) ac voltage polarity, the cycloconverter can be controlled such that one half-bridge maintains its devices on while the other performs the switching modulation. Alternatively or additionally for some operational conditions (such as small AC voltage or uncertain AC voltage polarity) the cycloconverter can be controlled such that FETs 89a, 89d operate (i.e. are switched) substantially simultaneously, and FETs 89b, 89c operate (i.e. are switched) substantially simultaneously but complementary to FETs 89a, 89d. It should be appreciated that in the exemplary embodiment of FIG. 8, FETs 89a-89d may be provided as MOSFETs although other types of FETs or other types of switching elements may also be used. It should also be appreciated that a controller 85', which may be the same as or similar to controller 85 described above in conjunction with FIG. 7, provides appropriate control signals to the switching elements which provide buffer 86 and cycloconverter 88 (e.g. to gate terminals of FETs 89a-89d).

One significant implementation benefit of this configuration is the ability to use both common and separate capacitive decoupling paths for each half-bridge. With the separate decoupling paths, and a known AC voltage polarity, the resonant current through the cycloconverter passes through a single switch in the modulating half-bridge, but is split between the two switches in the other half-bridge which is held on. This reduces the effective series resistance the current travels through from $2R_{ds,on}$ to $\tfrac{3}{2}R_{ds,on}$. Additionally, this structure greatly reduces circuit-board layout complexity and parasitic circuit characteristics by allowing each half of the cycloconverter to be optimized and placed separately, reducing the high AC-current path loop area. Thus, while each half of the cycloconverter is operationally identical, each can be implemented independently (i.e. the physical board layout due to external constraints).

For an unknown or wrongly known AC voltage polarity, such as near the AC zero voltage transition, operation with one half-bridge modulating and the other held on creates a condition where the AC source may unintentionally see a short-circuit. Elimination of this condition is important to the robustness and desired operation of the cycloconverter. When both half-bridges are modulated synchronously, a direct path across the ac source does not exist through the cycloconverter, removing the possibility of an undesired short-circuit condition.

The loss analysis is based upon the implementation for a micro-inverter for connection of a single photovoltaic panel to a 240V single-phase line voltage. The specific operating requirements are:

Input Voltage: 25-40VDC
Output Voltage: 240+1-10% VAC; rms
Output Power: 0-175 W
Line Frequency: 50-60 Hz

TABLE 1

| | Percent Power | | | | | |
|---|---|---|---|---|---|---|
| | 100 | 75 | 50 | 30 | 20 | 10 |
| Weighting | 0.05 | 0.53 | 0.21 | 0.12 | 0.05 | 0.04 |

Additionally, the evaluation of photovoltaic inverters is done according to the California Energy Commission (CEC) standards, which places weights based on the efficiency of the converter at fractional output power levels. These weightings are shown in Table 1. Additionally, this evaluation is required to be performed with the input voltage at its minimum, maximum, and at a nominal value. This is all done in an attempt to have the efficiency more accurately reflect the usage pattern of the panel and inverter. This wide operating requirement and complex weighting scheme creates challenges for optimizing any converter design, but it also presents a good opportunity for fully mapping out the operating methods for the proposed topology.

Estimates for the inverter efficiency are broken down into four categories: semiconductors, magnetics, and energy storage. Each operating mode outlined in the previous section suffers from the same basic loss mechanisms, but due to the different switching patterns and current magnitudes, their losses do vary. For brevity, only the losses for the constant-current phase-shift design are presented here. Losses from housekeeping functions, control, sensors, isolators, etc are not included in the breakdown.

The traditional loss mechanisms for switching devices are: on-state conduction loss, turn-on and turn-off overlap loss, and gating loss. As previously described, zero voltage switching effectively eliminates the turn-on and turn-off losses which are normally present in hard-switched converters. The loss for each MOSFET can then be written as the sum of its conduction and gating losses, $P=I^2_{rms}R_{on}+Q_g V_g f_{sw}$. Using the device figure of merit $SQRT(Q_g R_{on})$, a group of candidate devices can be selected for use in the optimization process.

Figure 9:
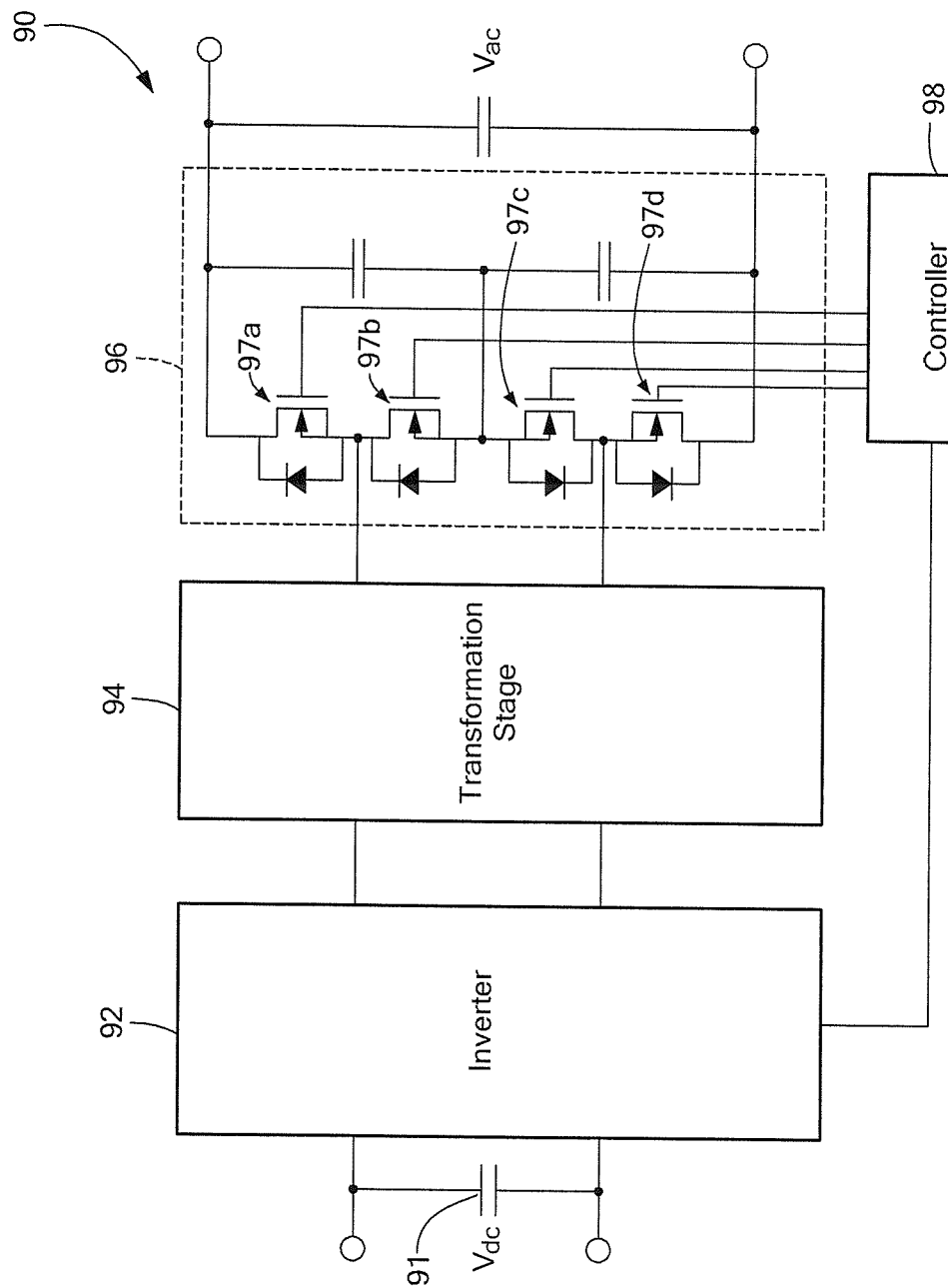
FIG. 9 is a schematic diagram of a power converter circuit having a dual half-bridge cycloconverter.

Referring now to FIG. 9, a second topology variant can be derived from the converter topology described above in conjunction with FIG. 1. In this embodiment, a power conversion circuit 90 has an energy storage element 91, shown as a capacitor in the exemplary embodiment of FIG. 9, coupled across a DC port thereof. An inverter circuit 92 has a first port corresponding to the DC port of the power conversion circuit and a second port at which an AC signal (e.g. an AC output current) is provided. A transformation stage 94 has a low-voltage port, which is coupled to the AC port of inverter 92, and a high-voltage port coupled to an input port of a cycloconverter circuit 96 comprised of a plurality of FETs 97a-97d and associated bypass capacitors. Transformation stage 92 is configured to provide voltage transformation between its low-voltage port and its high-voltage port and appropriate impedance shaping. The input port of cycloconverter circuit 96 is configured to receive an AC input from transformation stage 92 and cycloconverter 96 provides an output AC signal at an output port thereof corresponding to the output port of the power conversion circuit. FETs 97a, 97d operate simultaneously and FETs 97b, 97c operate simultaneously but complementary to FETs 97a, 97d. It should, however, be appreciated that this is not the only operational method—i.e. the operation of this cycloconverter may be identical to the operation described above in conjunction with FIG. 8. One may also choose to vary the operational method as conditions vary (e.g., depending on the value of the AC voltage, the amount of current being processed, and/or other factors.) It should be noted that power conversion circuit 90 does not include a buffer stage. Eliminating the buffer stage structure, and instead placing an energy storage element across the DC port (e.g. shown as a capacitor 91 in FIG. 9), still provides a number of the benefits provided by the inverter topology of FIG. 1. In particular, full soft-switching with unipolar devices, wide operating range control, and four-quadrant control are realized in such a topology. Control is realized with a controller 98 which provides combinations of phase-shift and pulse-width modulation and frequency control of the inverter, phase shift of the cycloconverter with respect to the full bridge, and pulse-width modulation cycloconverter half-bridges. Additional control of average power delivery can be obtained with on-off or burst mode control at a frequency below the switching frequency and above the line frequency and/or by bursting on and off for individual line cycles. It should be appreciated that in the exemplary embodiment of FIG. 9, FETs 97a-97d may be provided as MOSFETs although other types of FETs or other types of switching elements may also be used. It should also be appreciated that controller 98 may be the same as or similar to controllers 85, 85' described above in conjunction with FIGS. 7 and 8.

Figure 10:
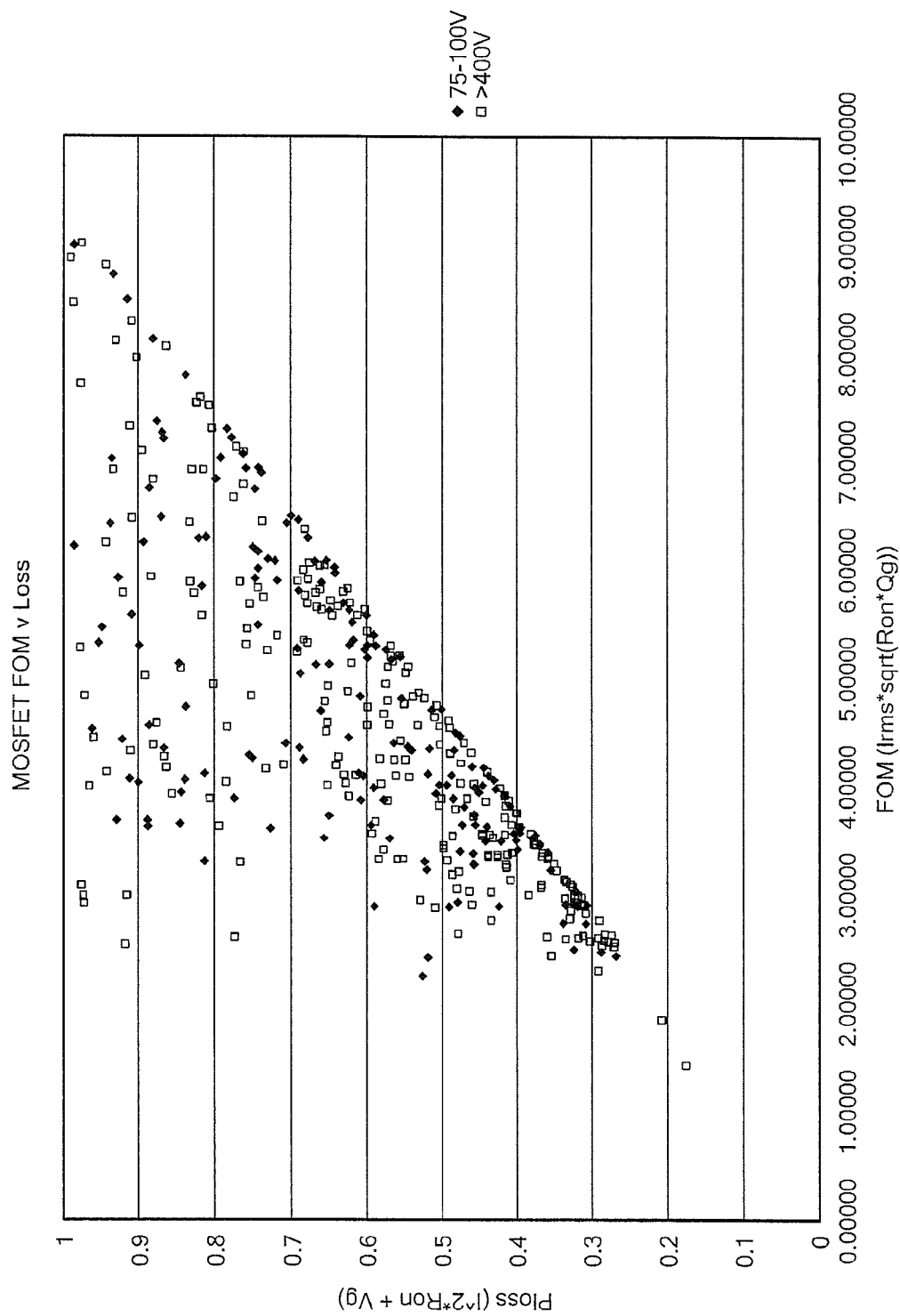
FIG. 10 is a scatter plot of metal oxide semiconductor field effect transistor (MOSFET) devices for both the high-voltage and low-voltage sides of a converter.

Referring now to FIG. 10, a scatter plot of MOSFET devices for both the high-voltage and low-voltage sides of the converter is shown. The devices toward the bottom left corner exhibit the best fit for use in the converter—lower figure-of-merit values are the most suitable. The plot of FIG. 10 illustrates the relation between MOSFET figure-of-merit and their power-loss calculations for full power. The plot is composed of two data sets, the low-voltage and high-voltage devices. The figure-of-merit values for the low-voltage devices were multiplied by a factor of 5 to account for the increased current seen on the low-voltage side of the converter.

A survey of applicable capacitors, currently limited to aluminum electrolytic, has allowed a clear understanding of relationships between energy density, loss-volume product, and rated voltage. Higher voltage capacitors generally have a higher energy storage density, as energy rises with the square of the voltage, while volume typically grows linearly. From an efficiency standpoint, the efficiency that can be obtained per unit volume is an important concern.

Figure 11:
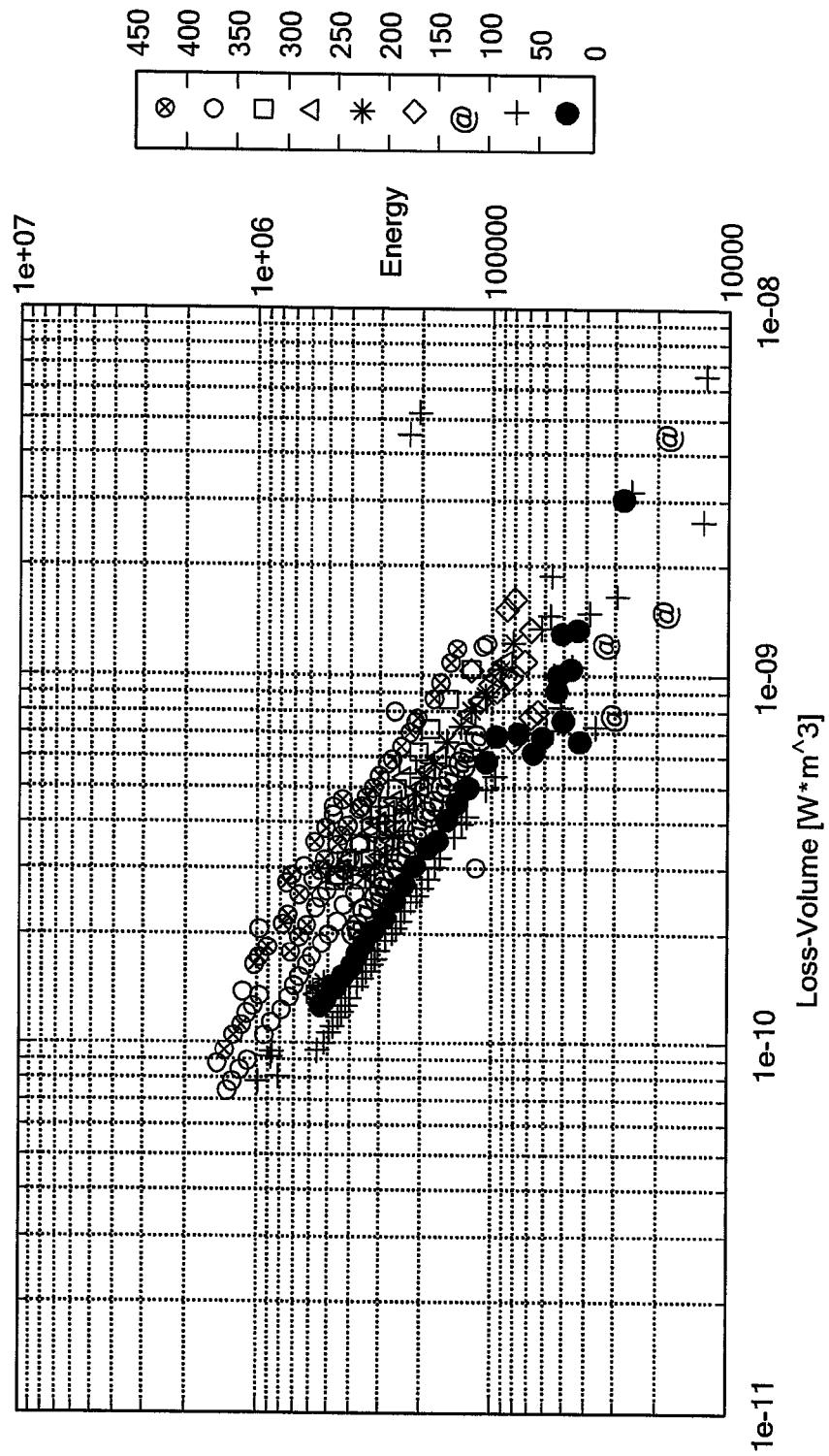
FIG. 11 is a scatter plot of obtainable capacitors for use in a converter.

Referring now to FIG. 11, a high level view of obtainable capacitors is shown. Capacitors of interest are located near the top left of the scatter plot, as these have the highest energy density and lowest loss per unit volume.

Figure 12:
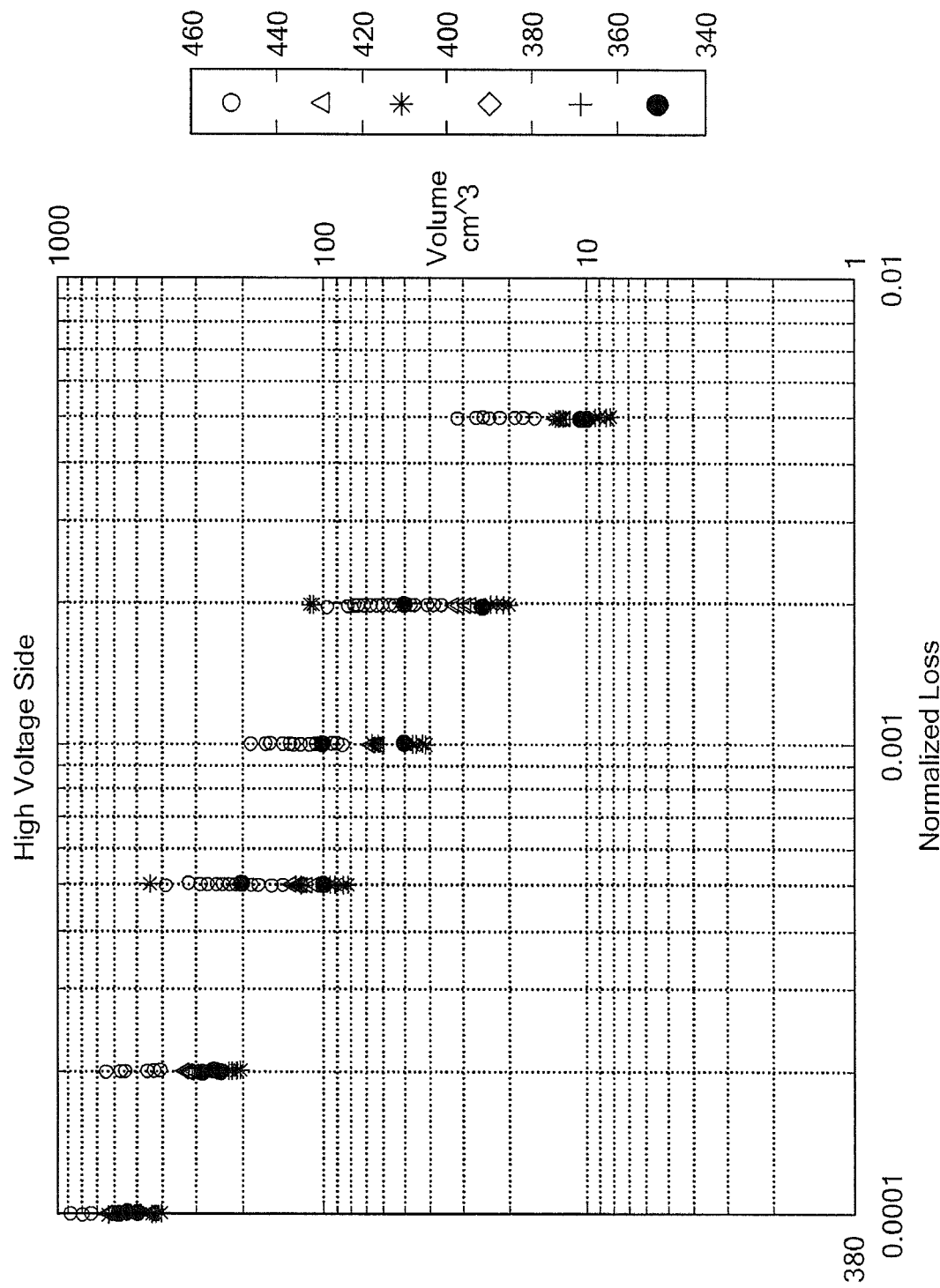
FIG. 12, a plot which illustrates required capacitor volume to achieve a given normalized loss as well as a loss-volume relationship.

Referring now to FIG. 12, a plot which illustrates required capacitor volume to achieve a given normalized loss is shown. The plot also illustrates a loss-volume relationship. This information can be used to select a capacitor that gives the lowest loss for a given amount of physical space. The operating voltage of buffer capacitor has been selected to be half of the effective peak line voltage ($V_c=V_{l,pk}/2$), so that the same peak current is required as for that of the line. This operating voltage, approximately 180V, provides a range of well suited capacitor choices for testing.

The design of the transformer and resonant inductor are dependent on a number of parameters: peak and RMS current, operating frequency, number of turns, core geometry, magnetic material, and wire diameter. Additionally, the effect of these parameters on power loss is generally based on non-linear relationships, complicating the analysis. Facing this multitude of parameters, a software program can be used to iterate over a finite set of parameter combinations and determine a design with the lowest loss. This program takes into account skin effect, proximity effect, flux dependent core loss, and frequency dependent core losses.

The MOSFET figure of merit (FOM) should be a useful normalized quantity for comparing similar items of interest, and should be a result of an item's intrinsic properties. By limiting the FOM to intrinsic properties, implementation specific quantities become external.

In a standard hard-switched MOSFET device, three primary loss mechanisms occur over an off-on-off transition sequence: transitional (overlap), on-state conduction, and gate charge losses. The finite turn-on and turn-off transition time, and the present non-zero voltage and current create overlap losses. In the device on state, the loss is due to current conduction through its resistive channel. The third form of loss, gating, come from the energy required to charge the gate capacitances to turn the device on and off.

In a zero-voltage-switching converter, the MOSFET ideally has zero voltage across its channel during the on-off-on transitions, eliminating the overlap loss terms. With these considerations, the switch power loss can be written as:

$$P_{loss} = I^2_{rms} R_{on} + V_g Q_g f + V_D I_D (t_r + t_f) f \qquad (1)$$

In which:
Conduction losses are represented as $I^2_{rms} R_{on}$
Gating losses are represented as $V_g Q_g f$
Overlap losses are represented as $V_D I_D (t_r + t_f) f$ If the MOSFET device parameters are considered on a per-unit-area basis, with $R_{on} = r_{on}/A$ and $Q_g = q_g A$, the device characteristics can be normalized from its fabricated size. As the area of the device increases, gating loss will increase while conduction loss will decrease. Therefore, the power loss will have a minimum when $dP_{loss}/dA = 0$.

Having described preferred embodiments of the concepts, systems, circuits and techniques described herein, it will now become apparent to those of ordinary skill in the art that other embodiments incorporating these concepts may be used. For example, it should now be appreciated that one can apply the topologies described herein to rectifier systems (e.g. for grid-connected power supplies) as well and for bidirectional power flow converter systems. Accordingly, it is submitted that that the concepts, systems, circuits and techniques described herein, should not be limited to the described embodiments but rather should be limited only by the spirit and scope of the appended claims.

The invention claimed is:

1. A power conversion circuit having an input port configured to receive a direct current (DC) input and an output port at which an alternating current (AC) output is provided, the power conversion circuit comprising:
an inverter circuit having an input port coupled to the input port of the power conversion circuit and providing an AC output current at an inverter output port;
a transformer circuit having a low-voltage port and a high-voltage port, said transformer circuit configured to provide voltage transformation between the low-voltage port and the high-voltage port;
a cycloconverter circuit having a cycloconverter input port coupled to said transformer and an output port coupled to the output port of the power conversion circuit; and
a buffer block circuit series coupled between at least two of: said inverter; said transformer; and said cycloconverter circuit.

2. The power conversion circuit of claim 1 wherein said buffer block circuit is configured to absorb local average differences in power between that received at the input port of the power conversion circuit and delivered to the output port of the power conversion circuit.

3. The power conversion circuit of claim 1 wherein said buffer block circuit comprises a storage element and a switch element and in response to a changing voltage of an AC signal provided to said buffer block circuit, said switch element switches to absorb or deliver power to said storage element such that said buffer block circuit compensates for a power mismatch between the input and output ports of said power conversion circuit.

4. The power conversion circuit of claim 1 wherein said buffer block circuit is series coupled between two of: the output port of said inverter; the low-voltage port of said transformer; the high-voltage port of said transformer; and the input port of said cycloconverter circuit.

5. The power conversion circuit of claim 1 wherein said buffer block circuit is provided having two terminals with a first terminal coupled to one of: the output port of said inverter; the low-voltage port of said transformer; the high-voltage port of said transformer; and the input port of said cycloconverter circuit; and a second terminal coupled to a second different one of: the output port of said inverter; the low-voltage port of said transformer; the high-voltage port of said transformer; and the input port of said cycloconverter circuit such that said buffer block circuit is series coupled between at least two of: said inverter, said transformer; and said cycloconverter circuit.

6. The power conversion circuit of claim 1 wherein said buffer block circuit comprises:
a storage element having first and second terminals, with a first one of the first and second terminals coupled to the first terminal of said buffer block circuit; and
a switching element having a first terminal coupled to a second one of the first and second terminals of said storage element and a second terminal coupled to the second terminal of said buffer block circuit.

7. The power conversion circuit of claim 6 wherein said storage element corresponds to a capacitor and said switching element comprises one or more switches.

8. The power conversion circuit of claim 7 wherein said switching element comprises a plurality of switches configured as a half bridge circuit.

9. The power conversion circuit of claim 1 wherein said inverter circuit is provided as a soft-switched resonant inverter circuit which provides a high-frequency (HF) AC signal at the output port thereof.

10. The power conversion circuit of claim 1 wherein in response to a changing voltage of an AC signal provided to the output port of said cycloconverter, said cycloconverter modulates the transfer of current between the input and output ports of said cycloconverter.

11. The power conversion circuit of claim 1 wherein said cycloconverter comprises first and second half-bridge circuits.

12. The power conversion circuit of claim 11 wherein said first and second half-bridge circuits correspond to first and second unidirectional voltage blocking half-bridge circuits coupled in a back-to-back configuration.

13. The power conversion circuit of claim 1 wherein said cycloconverter is controlled to provide a phase-shift between a resonant current and a synthesized half-bridge voltage of at least one of: said buffer block circuit or said cycloconverter such that said cycloconverter manages power transfer between said buffer block circuit and said cycloconverter.

14. The power conversion circuit of claim 1 wherein the relative phases of the switching timing patterns of said inverter, said buffer block circuit and said cycloconverter circuit are selected such that a desired power transfer is achieved among the input port, the output port, and said buffer block.

15. The power conversion circuit of claim 1 wherein said cycloconverter comprises
 a first half-bridge circuit having first, second and third terminals; and
 a second half-bridge circuit having first, second and third terminals wherein the first terminal of each of the first and second half-bridge circuits form a port corresponding to the input of the cycloconverter circuit, the second terminal of each of the first and second half-bridge circuits form a port corresponding to the output of the cycloconverter circuit and the third terminal of the first half-bridge circuit is coupled to the third terminal of the second half-bridge circuit.

16. The power conversion circuit of claim 15 wherein for a first polarity of an output voltage signal provided at the output of the cycloconverter circuit, the first and second switches of the first half-bridge circuit are biased into their conduction states and the first and second switches of the second half-bridge are modulated.

17. The power conversion circuit of claim 16 wherein for a second different polarity of an output voltage signal provided at the output of the cycloconverter circuit, the first and second switches of the second half-bridge circuit are biased into their conduction states and the first and second switches of the first half-bridge circuit are modulated.

18. A power conversion circuit having a pair of input terminals configured to receive a direct current (DC) voltage signal and a pair of output terminals at which an alternating current (AC) voltage signal is provided, the power conversion circuit comprising:
 an inverter circuit having a pair of input terminals corresponding to the input terminals of the power conversion circuit and having a pair of output terminals and wherein said inverter circuit is configured to convert between a DC voltage signal at the pair of input terminals and a high-frequency AC signal at the pair of output terminals;
 a transformation stage having a pair of input terminals coupled to the pair of output terminals of said inverter circuit and having a pair of output terminals wherein said transformation stage is configured provide voltage scaling of the high-frequency AC signal at the output of the inverter circuit and isolates said inverter circuit; and
 a cycloconverter having a pair of input terminals coupled to the pair of output terminals of said transformation stage and having a pair of output terminals corresponding to the output terminals of the power conversion circuit, said cycloconverter circuit configured to receive a high-frequency AC signal from said transformation stage and to frequency convert between the high-frequency AC signal and the AC signal at the pair of output terminals of said cycloconverter, said cycloconverter comprising:
  a first half-bridge circuit having first, second and third terminals; and
  a second half-bridge circuit having first, second and third terminals wherein the first terminal of each of the first and second half-bridge circuits correspond to the input of the cycloconverter circuit, the second terminal of each of the first and second half-bridge circuits correspond to the output of the cycloconverter circuit and the third terminal of the first half-bridge circuit is coupled to the third terminal of the second half-bridge circuit;
 wherein the first half-bridge circuit of said cycloconverter circuit comprises first and second switches each having first, second and third terminals and a bypass capacitor.

19. The power conversion circuit of claim 18 wherein for a first range of an output voltage signal provided at the output of the cycloconverter circuit, the first and second switches of the first half-bridge circuit are biased into their conduction states and the first and second switches of the second half-bridge are modulated.

20. The power conversion circuit of claim 19 wherein for a second separate range of an output voltage signal provided at the output of the cycloconverter circuit, the first and second switches of the second half-bridge circuit are biased into their conduction states and the first and second switches of the first half-bridge circuit are modulated.

21. The power conversion circuit of claim 18 wherein, for at least some operating conditions, the first switch of the first half-bridge circuit and the second switch of the second half-bridge circuit are modulated on and off together substantially simultaneously, and the second switch of the first half-bridge circuit and the first switch of the second half-bridge circuit are modulated on and off together substantially simultaneously.

22. A cycloconverter circuit having an input and an output, cycloconverter circuit comprising:
 a first half-bridge circuit having first, second and third terminals, said first half-bridge circuit comprising first and second switches each having first, second and third terminals and a bypass capacitor; and
 a second half-bridge circuit having first, second and third terminals, said second half-bridge circuit comprising first and second switches each having first, second and third terminals and a bypass capacitor wherein the first terminal of each of the first and second half-bridge circuits correspond to the input of the cycloconverter circuit, the second terminal of each of the first and second half-bridge circuits correspond to the output of the cycloconverter circuit and the third terminal of the first half-bridge circuit is coupled to the third terminal of the second half-bridge circuit.

23. The cycloconverter circuit of claim 22 wherein for a first range of an output voltage signal provided at the output of the cycloconverter circuit, the first and second switches of the first half-bridge circuit are biased into their conduction states and the first and second switches of the second half-bridge are modulated and wherein for a second different range of an output voltage signal provided at the output of the cycloconverter circuit, the first and second switches of the second half-bridge circuit are biased into their conduction states and the first and second switches of the first half-bridge circuit are modulated.

24. The cycloconverter circuit of claim 22 wherein, for at least some operating conditions, the first switch of the first half-bridge circuit and the second switch of the second half-bridge circuit are modulated on and off together and the second switch of the first half-bridge circuit and the first switch of the second half-bridge circuit are modulated on and off together.

* * * * *